United States Patent [19]
Hsieh

[11] Patent Number: 5,879,821
[45] Date of Patent: Mar. 9, 1999

[54] ELECTROLUMINESCENT POLYMER COMPOSITIONS AND PROCESSES THEREOF

[75] Inventor: Bing R. Hsieh, Webster, N.Y.

[73] Assignee: Xerox Corporation, Stamford, Conn.

[21] Appl. No.: 969,727

[22] Filed: Nov. 13, 1997

[51] Int. Cl.[6] .............................. B32B 15/04; B32B 7/00
[52] U.S. Cl. .......................... 428/690; 313/504; 313/506; 428/457; 428/917; 528/125; 528/174; 528/175; 528/191; 528/226; 528/327
[58] Field of Search .................................... 428/690, 917, 428/457; 528/125, 174, 175, 327, 191, 226; 313/504, 506

[56] References Cited

U.S. PATENT DOCUMENTS

| | | | |
|---|---|---|---|
| 5,247,190 | 9/1993 | Friend et al. .............................. | 257/40 |
| 5,317,169 | 5/1994 | Nakano et al. ............................ | 257/40 |
| 5,514,878 | 5/1996 | Holmes et al. ............................ | 257/40 |
| 5,543,079 | 8/1996 | Ohnishi et al. .................... | 252/301.35 |
| 5,589,320 | 12/1996 | Ohnishi et al. ......................... | 430/321 |
| 5,674,635 | 10/1997 | Msieh et al. ............................. | 428/917 |
| 5,681,664 | 10/1997 | Tamano et al. .......................... | 428/690 |
| 5,763,110 | 6/1998 | Mu et al. ................................. | 313/504 |

*Primary Examiner*—John M. Cooney, Jr.
*Attorney, Agent, or Firm*—John L. Haack

[57] ABSTRACT

A charge transport polymer including repeat units selected from mers of the formulas

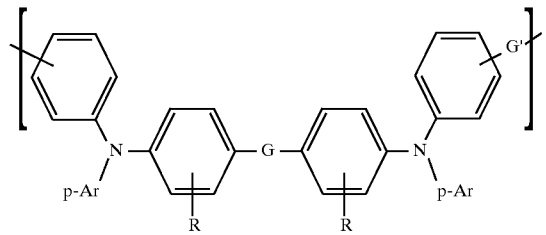

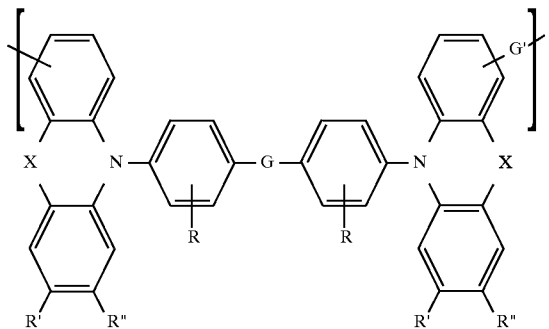

and

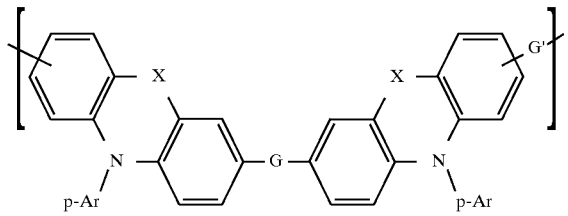

and copolymers, and mixtures thereof.

20 Claims, No Drawings

ELECTROLUMINESCENT POLYMER COMPOSITIONS AND PROCESSES THEREOF

CROSS REFERENCE TO COPENDING APPLICATIONS AND PATENTS

Reference is made to commonly assigned copending applications: U.S. Ser. No. 08/707,162, filed Sep. 3, 1996, now U.S. Pat. No. 5,763,110, entitled "ELECTROLUMINESENT DEVICES"; U.S. Ser. No. 08/707,260 (D/96174) filed Sep. 3, 1996, entitled "ELECTROLUMINESENCT DEVICES"; and U.S. Ser. No. 08/751,530, filed Nov. 13, 1996, now U.S. Pat. No. 5,753,757, entitled "ELECTROLUMINESCENT POLYMER COMPOSITIONS AND PROCESSES THEREOF"; U.S. Ser. No. 08/751,532, filed Nov. 13, 1996, now U.S. Pat. No. 5,817,430, entitled "ELECTROLUMINESCENT POLYMER COMPOSITIONS AND PROCESSES THEREOF"; U.S. Ser. No. 08/950,303, filed Oct., 14, 1997, entitled "CONDUCTIVE POLYMER COATINGS AND PROCESSES THEREOF" which is now U.S. Pat. No. 5,853,906; U.S. Ser. No. 08/950,300, filed Oct., 14, 1997, entitled "CONDUCTIVE POLYMER COATINGS AND PROCESSES THEREOF"; U.S. Ser. No. 08/969,825, Nov. 13, 1997, entitled "ELECTROLUMINESCENT POLYMER COMPOSITIONS AND PROCESSES THEREOF"; and U.S. Ser. No. 08/942,598 (D/97273), filed Oct. 2, 1997, entitled "NOVEL HOLE TRANSPORT MATERIALS AND ORGANIC ELECTROLUMINESCENT DEVICES THEREOF".

Attention is directed to commonly owned and assigned U.S. Pat. No. : 5,558,904, issued Sep. 24, 1996, entitled "ELECTROLUMINESCENT DEVICES CONTAINING A CONJUGATED POLYMER OBTAINED VIA HALOGEN PRECURSOR ROUTE CHEMISTRY" and U.S. Pat. No. 5,674,635, issued Oct. 7, 1997, entitled "ELECTROLUMINESCENT DEVICE", which discloses an electroluminescent (EL) device including a polymeric tetraaryl-substituted biphenyidiamine.

The disclosures of each of the aforementioned copending applications and patents are totally incorporated herein by reference. The appropriate components and processes of these patents and copending applications may be selected for the compositions, EL devices, and processes of the present invention in embodiments thereof.

BACKGROUND OF THE INVENTION

The present invention relates to electroluminescent polymer compositions and processes for the preparation and use thereof in, for example, electroluminescent devices such as electroluminescent displays and electrochemical cells. More particularly, the invention relates to polymer compositions and to processes for making and using in, for example, high performance, that is, high stability and high luminosity electroluminescent displays and devices.

The present invention, in embodiments, is directed to processes for preparing soluble polymers, especially conjugated polymers, wherein at least one solubilizing side chain or substitutent which is present in the monomer imparts desirable solubility and processibility properties to the resulting polymer product.

Conjugated polymers are an important class of light emitting polymers for electroluminescent (EL) devices. There are two principal approaches to the fabrication of conjugated polymer thin films, namely, the precursor approach and side chain approach. The former relies on the preparation of a soluble precursor polymer which can be cast into thin films. The precursor polymer can then be converted to the final conjugated polymer films through solid-state thermo- or photo-conversion. Friend et al., disclosed EL devices based on poly(p-phenylene vinylene) (PPV) thin films derived from a sulfonium precursor route, reference U.S. Pat. No. 5,247,190. Hsieh et al., disclosed similar PPV EL devices using halogen precursor routes as disclosed in the aforementioned commonly owned U.S. Pat. No. 5,558,904. Son et al., reported PPV based EL devices using a xanthate precursor route in Science, 1995, 269, 376–380. There are several problems associated with the precursor approach. First, the precursor polymers derived from these precursor routes have unsatisfactory molecular structures because they are typically random copolymers containing 5–50% of converted segments. Second, expensive and potentially environmentally harmful photo- or thermo-conversion is required. Third, the presence of structural defects arising from incomplete thermoconversion and side reactions with volatile organic species generated during the thermal conversion. These aspects can lead to poor device properties and poor manufacture reproducibility.

The side chain approach of the present invention involves the formation of polymers by the polymerization of a monomer containing soluble substituents or side groups to afford a soluble conjugated polymer that can be cast into thin film directly without conversion. The polymerization of bis(halomethyl)benzenes in the presence of large excess base to provide PPV products was first reported by Gilch et al., in *Journal of Polymer Science*: Part A-1, 4:1337 (1966). In principle, the adaptation of the Gilch route to the polymerization of a 1,4-bis(halomethyl)benzene containing solubilizing groups should give a soluble PPV derivative. Unfortunately, this is not the situation in practice primarily because of polymer product precipitation during polymerization. The precipitation may be caused by the high molecular weight, semicrystallinity and/or cross-linking of the product. As a result, the desired soluble product has been obtained in very low yields (<10%). The Gilch route is disadvantaged in that is lacks sufficient control over molecular weight of the polymer. Another problem of the Gilch route is the lack of control over polymer chain ends and polymer architecture. These problems have been effectively solved by the use of non-polymerizing acidic additives as disclosed in the aforementioned copending U.S. Ser. No. 08/751,532, now U.S. Pat. No. 5,817,430.

Conjugated polymers, such as poly(p-phenylene vinylenes), and electron acceptors, such as Buchminsterfullerenes C60, can be fabricated into heterojunction diodes for use in photodiodes and photovoltaic cells, reference for example, U.S. Pat. Nos. 5,454,880 and 5,331,183 both issued to Sariciffci, et. al. U.S. Pat. No. 5,401,827, issued Mar. 28, 1995, to Holmes et al., discloses various semiconductive conjugated copolymers containing arylene vinylene segments converted from sulfonium precursor polymers. The bandgap and refractive index of the conjugated copolymer were controlled by the degree of conversion. The patterning of such conjugated copolymers for device application was disclosed in U.S. Pat. No. 5,328,809, their application in luminescent devices was disclosed in U.S. Pat. No. 5,512,654, and their application in optical devices was disclosed in U.S. Pat. Nos. 5,425,125 and 5,523,555. U.S. Pat. No. 5,653,914, issued Aug. 5, 1997, to Holmes et al., discloses a processible polymer matrix such as polymethylmethacryate and a chromophoric component such as stilbene or distyrylbenzene for electroluminescent device application. The chromophoric components are blended into the polymer matrix or covalently attached thereto as a side group. U.S. Pat. Nos. 5,597,890 and 5,599,899, issued Jan. 28, 1997 and Feb. 4, 1997, to Jenekhe, disclose heterocyclic rigid rod and ladder polymers for electroluminescent device applications. Since the polymers were not soluble in organic solvents, they required dissolution in acid for film deposition, followed by water washing to remove residual acid. This acid processing scheme is complex, expensive, poor in reproducibility, and produces hazardous waste streams.

PRIOR ART

U.S. Pat. No. 5,247,190, issued Sep. 21, 1993, to Friend et al., discloses an electroluminescent device comprising a semiconductor layer in the form of a thin dense polymer film comprising at least one conjugated polymer, a first contact layer in contact with a first surface of the semiconductor layer, and a second contact layer in contact with a second surface of the semiconductor layer. The polymer film of the semiconductor layer has a sufficiently low concentration of extrinsic charge carriers that on applying an electric field between the first and second contact layers across the semiconductor layer so as to render the second contact layer positive relative to the first contact layer charge carriers are injected into the semiconductor layer and radiation is emitted from the semiconductor layer. The polymer film can be poly(p-phenylenevinylene) wherein the phenylene ring may optionally carry one or more substituents each independently selected from alkyl, alkoxy, halogen or nitro.

U.S. Pat. No. 5,317,169, issued May 31, 1994, to Nakano et al., discloses polymers of the formula of —[Ar—B]—, where in Ar is an aromatic group and B is a vinylene or NH group, for electroluminescence device application.

U.S. Pat. No. 5,543,079, issued Aug. 6, 1996, to Ohnishi et al., discloses soluble fluorescent terpolymers of the formula of —[Ar'—CH=CH]—[Ar"—CH=CH]—[Ar'"—CH=CH]—, where in Ar', Ar", and Ar'" are different aromatic groups. The application of such polymers in luminescent devices was disclosed in U.S. Pat. No. 5,589,320.

U.S. Pat. No. 5,514,878, issued Mar. 28, 1995, to Holmes et al., discloses soluble semiconductive conjugated polymers incorporating electron-withdrawing groups for use in electroluminescent devices. The polymers have the general structure of [Ar—CX=CH—Ar'—CH=CX], wherein Ar and Ar' are aromatic groups and X is the electron-withdrawing group.

Also of interest are U.S. Pat. Nos. 5,121,029, 5,126,214, 5,130,603, 5,336,546 and 5,366,811, which disclose the use of distyryl, tristyryl, and tetrastyryl compounds for the fabrication of blue light emitting diodes. U.S. Pat. No. 5,389,444 discloses light emitting polymers containing distyryl units in the main chains.

The disclosure of the aforementioned patents are totally incorporated herein by reference.

There continues to be a need for: easily accessible and processible semiconductive polymers that contain solubilizing side chain substituents for solvent processing; semiconductive polymers that contain ionizable groups to impart ionic conductivity to lower the device operation voltages and thus to increase the device stability; conjugated polymers that contain pendant chromophores; semiconductive polymers that can be used to fabricate multilayer structures via layer-by-layer molecular-level self-assembling schemes involving consecutive adsorption of polymers containing polyanions and polycations onto substrate surfaces from an aqueous phase or organic phase, for example, as disclosed in *Science*, 1997, 277, 1232–1237, and *Journal of Applied Physics*, 1996, 80(7), 4067–4071; semiconductive conjugated polymers that emit blue color light; and semiconductive polymers for applications in organic semiconductor devices such as light-emitting diodes, thin film transistors, photodetectors, electrochemical cells, light-emitting electrochemical cells, solar cells, and the like devices.

These needs and others solutions to the aforementioned problems are provided for in embodiments of the present invention and as illustrated herein.

SUMMARY OF THE INVENTION

Embodiments of the present invention, include:
overcoming, or minimizing deficiencies of prior art compositions and processes by providing compositions with improved conductivity and stability properties;
providing a charge transport polymer comprising repeat units or mers selected, for example, from the formulas

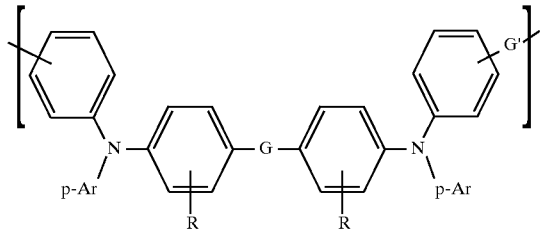

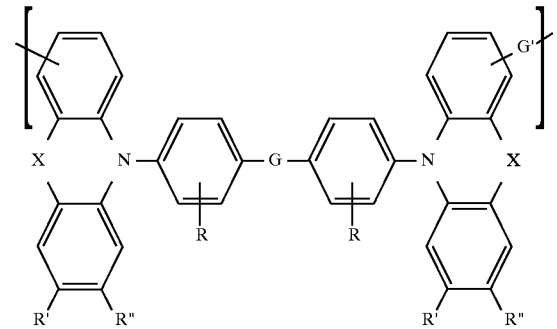

and

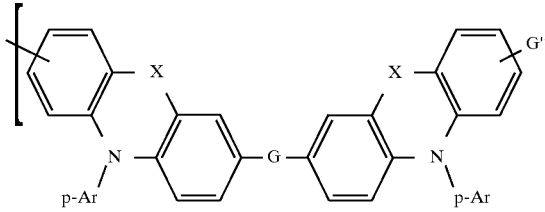

and copolymers, and mixtures thereof;
providing polymer processes and compositions which are suitable for use in organic semiconductor device fabrication and application including organic photoconductor, light-emitting diodes, thin film transistors, photodetectors, electrochemical cells, light-emitting electrochemical cells, solar cells; and the like articles and devices; and
providing semiconductive conjugated polymer compositions that are soluble in organic solvents, aqueous solvents, and mixtures thereof, and which solutions can be conveniently deposited as thin films by, for example, conventional spin coating methods.

DETAILED DESCRIPTION OF THE INVENTION

The present invention provides semiconductive conjugated polymer and copolymer compositions which are electrically and mechanically stable, and which polymers are useful, for example, in a variety of light-emitting devices and photoactive cells. In embodiments, the present invention provides charge transport polymers comprised of repeat units selected, for example, from the formulas

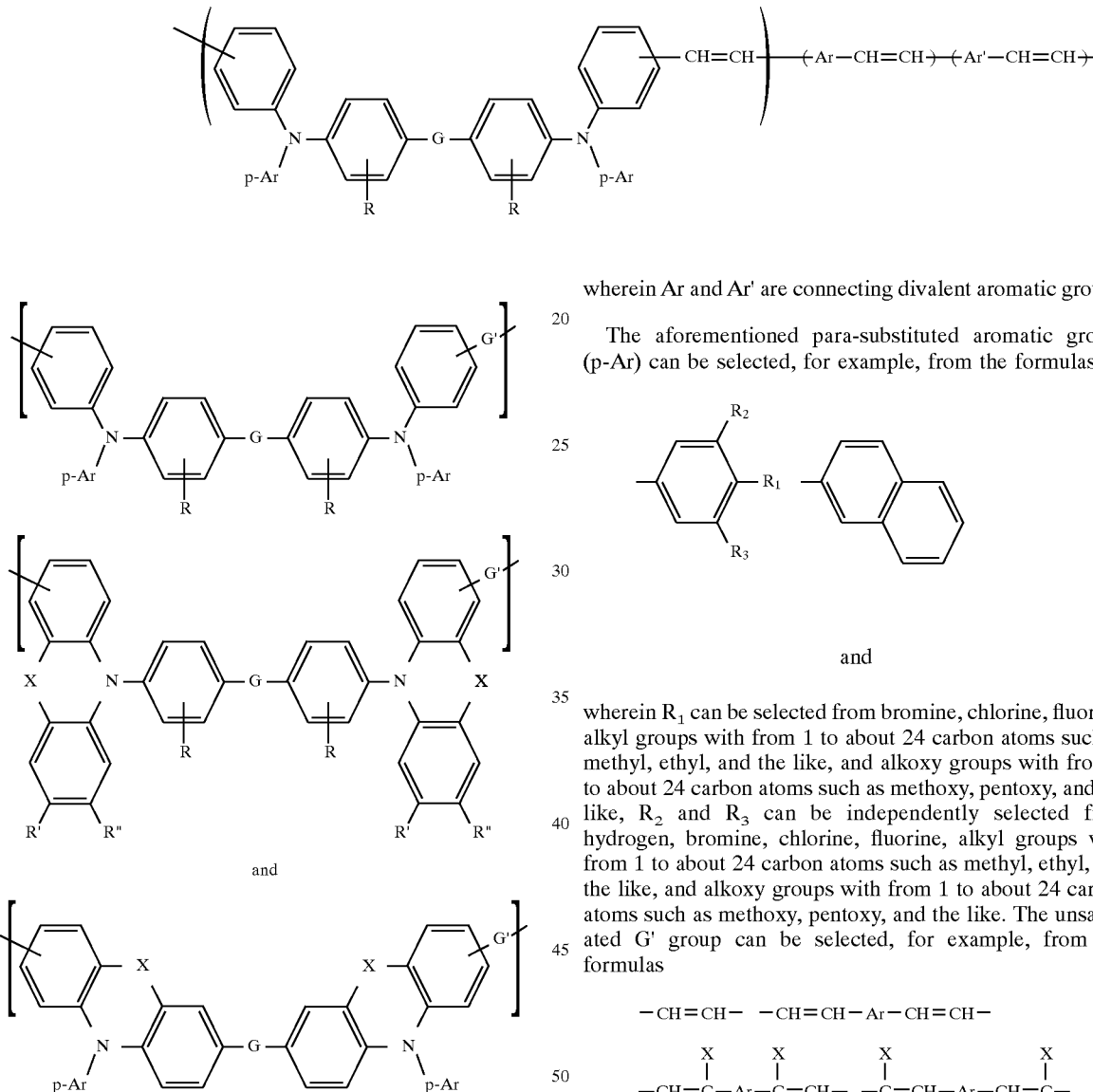

wherein G is nil, O, S, N—Ph, vinylene, acetylene, p-phenylene, m-phenylene, o-phenylene, or —CH═CH—Ph—CH═CH—; R is H, methyl, or methoxy; R' is an aryl group, an alkyl group, or an alkoxy group; R" is hydrogen, halogen, an aryl group, an alkyl group; X is nil, CH2, O, and S; p-Ar is a para-substituted aromatic group; and G' is an unsaturated double bond group. R' is selected from aryl groups with for 6 to about 18 carbon atoms, alkyl groups with 2 to about 24 carbon atoms, and alkoxy groups with 1 to about 12 carbon atoms; R" is selected from hydrogen, halogens, aryl groups with for 6 to about 18 carbon atoms, and alkyl groups with 2 to about 24 carbon atoms; and p-Ar is a para-substituted aromatic group with for 6 to about 18 carbon atoms.

In embodiments, two or more different repeat units or mers are selected and the polymer is a random or block copolymer. The copolymer can contain, for example, from 2 to about 10 different mers. An example of a copolymer containing 3 different repeat units or mers is the terpolymer of the formula

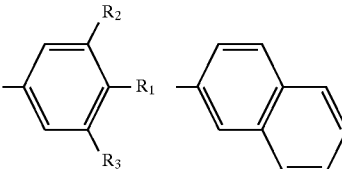

wherein Ar and Ar' are connecting divalent aromatic groups.

The aforementioned para-substituted aromatic groups (p-Ar) can be selected, for example, from the formulas

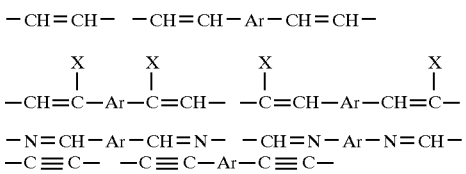

and wherein $R_1$ can be selected from bromine, chlorine, fluorine, alkyl groups with from 1 to about 24 carbon atoms such as methyl, ethyl, and the like, and alkoxy groups with from 1 to about 24 carbon atoms such as methoxy, pentoxy, and the like, $R_2$ and $R_3$ can be independently selected from hydrogen, bromine, chlorine, fluorine, alkyl groups with from 1 to about 24 carbon atoms such as methyl, ethyl, and the like, and alkoxy groups with from 1 to about 24 carbon atoms such as methoxy, pentoxy, and the like. The unsaturated G' group can be selected, for example, from the formulas

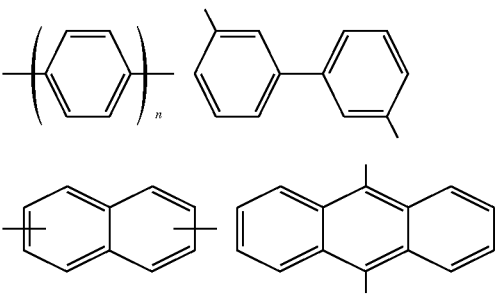

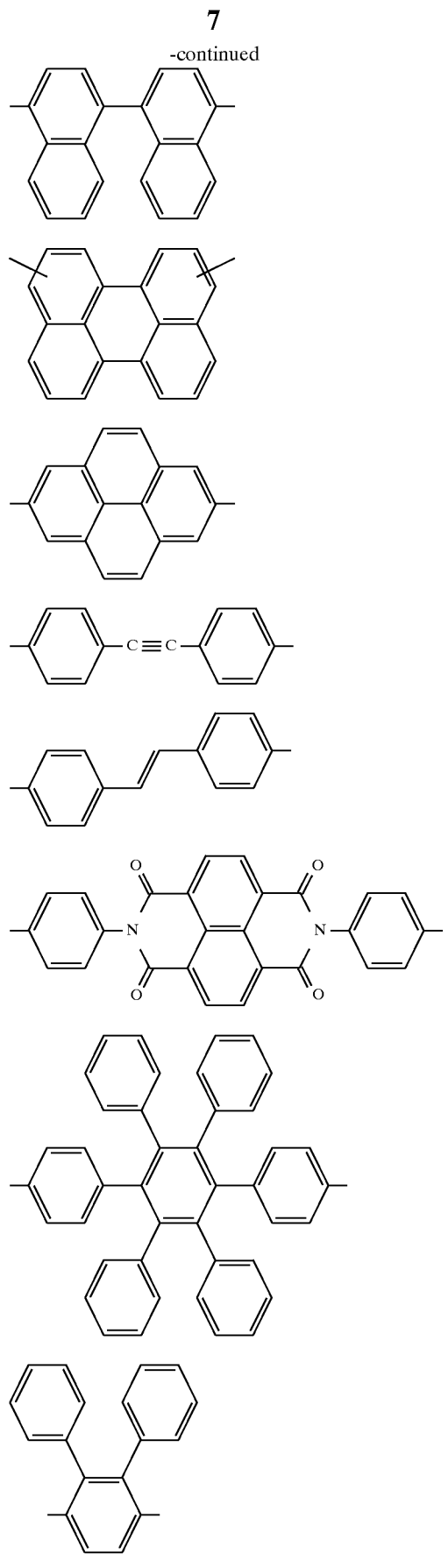
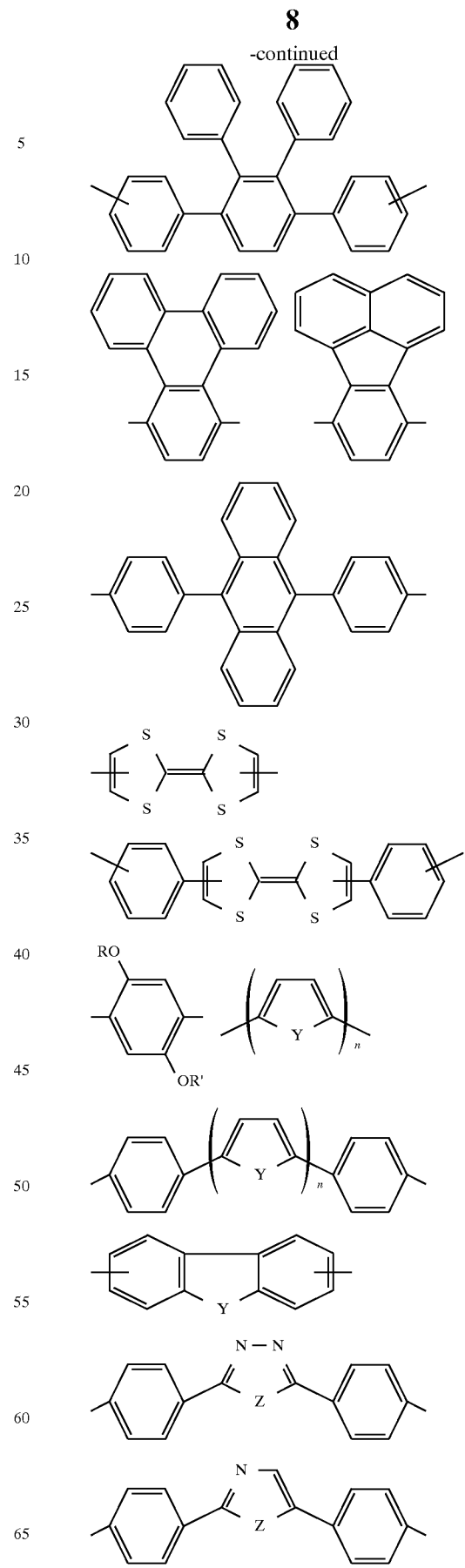

-continued

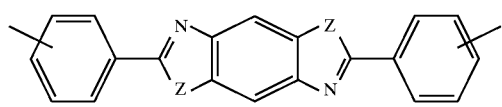

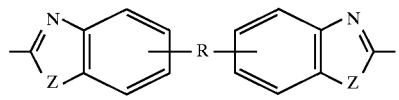

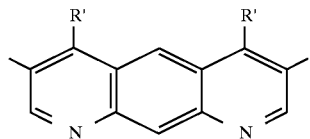

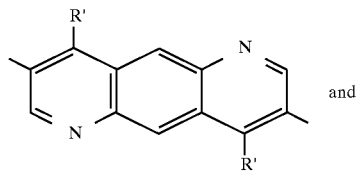

and

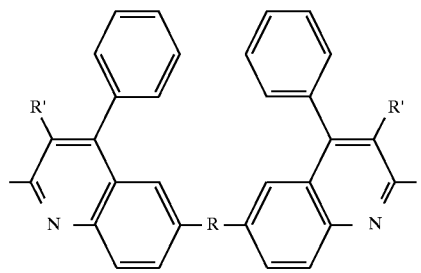

wherein X is electron withdrawing group selected, for example, from cyano, trifluoromethyl, pentafluorophenyl, nitro, phenylsulfone, and alkylsulfone groups with 1 to about 10 carbon atoms; n is an integer from 2 to 6; Y can be —$CH_2$—, $C(Ph)_2$, $C(R)_2$, O, S, NH, NR, and N—Ph, wherein R is an alkyl group with 1 to about 12 carbon atoms and Ph is an aryl or arylalkyl group with from 6 to about 18 carbon atoms such as para-substituted butylbenzene; Z is O, S, NH, NR, and N—Ph wherein R is an alkyl group with 1 to about 12 carbon atoms, and Ph is an aryl or arylalkyl group with from 6 to about 18 carbon atoms; R is nil, O, $C(CH_3)_2$, vinylene, and phenylenes; R' is an alkyl group with 1 to about 12 carbon atoms or phenyl group with from 6 to about 18 carbon atoms; and Ar is a divalent aromatic group. The (divalent aromatic groups Ar and Ar') can be to selected, for example, from the formulas

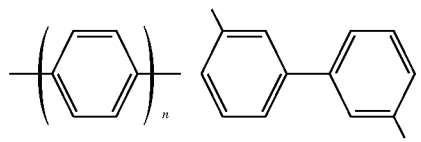

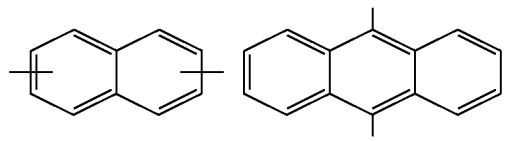

-continued

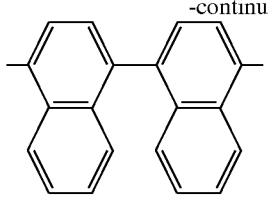

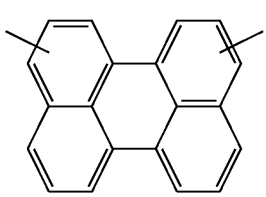

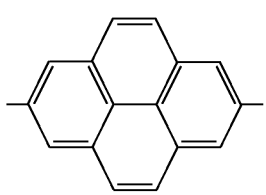

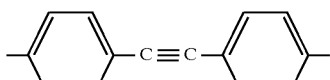

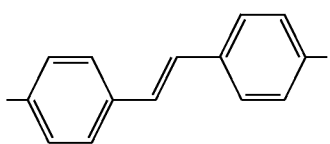

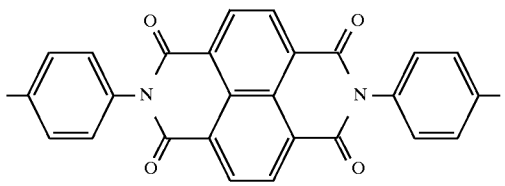

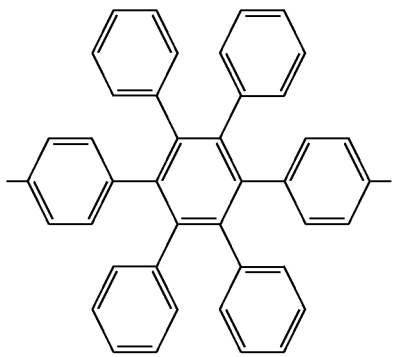

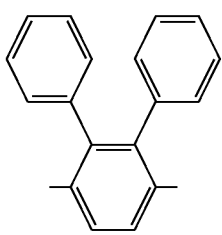

-continued

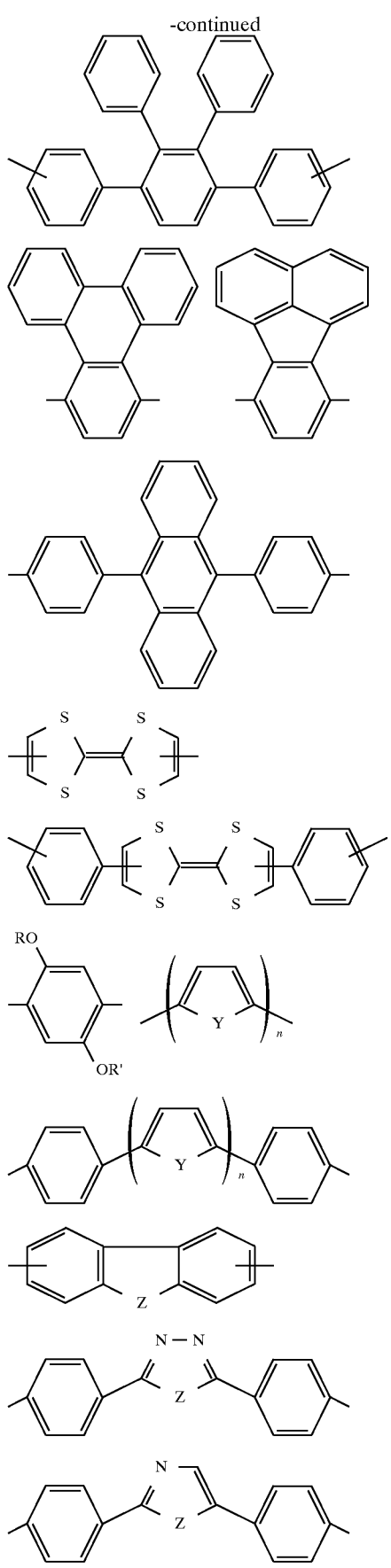

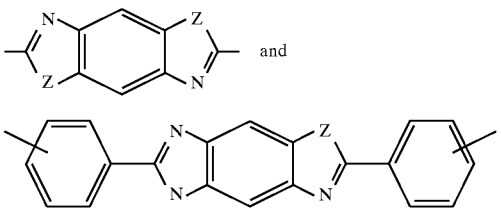

The weight average molecular weight of the polymers and copolymers of the present invention can be from about 3,000 to about 100,000, and preferably from about 10,000 to about 50,000, and more preferably, for about 20,000 to about 50,000. The number average molecular weight of the polymers and copolymers of the present invention can be from about 300 to about 10,000, and preferably from about 1,000 to about 5,000, and more preferably, for about 2,000 to about 5,000.

The polymer, copolymers, and mixtures and blends thereof of the present invention are preferably soluble in organic solvents. The solutions are particularly desirable for use depositing and forming thin film coatings for article and device fabrication. Preferred organic solvents are nitromethane, chloroform, methylene chloride, tetrahydrofuran, chlorobenezene, o-dichlorobenezene, 1,1, 2-trichloroethane, fluorobenezene, m-cresol, methyl ethyl ketone, benezene, toluene, xylenes and mixtures thereof.

The present invention provides, in embodiments, electroluminescent devices comprised of, for example, an anode, a metal oxide, a charge transport layer, a charge injecting layer, an electron injecting layer, a electron transport layer, and a cathode, and wherein the charge transport layer contains a single layer or multilayer comprised of at least one of the polymers or copolymers of the present invention. The EL device can, in embodiments, further comprise a dopant that is contained in the polymer layer that is, for example, molecularly dispersed using solution mixing or finely dispersed using mechanical methods. The dopant can be selected, for example, from known electron transport molecules, hole transport molecules, charge transport compounds and oxidized salts thereof, ionizable salts of ionomers and ionophores, an oxidant, light emitting compounds, and mixtures thereof. In embodiments, a preferred electroluminescent device is comprised of a preferred polymer of the formula

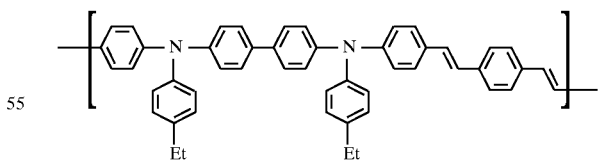

and wherein the device containing said polymer emits yellow green light with peak emission at about 530 nm, has a luminance, which is defined as luminous intensity per unit area projected in a given direction, of about 500 candella/$m^2$ at an applied voltage of 25 V.

In another preferred embodiment, an electroluminescent device of the present invention is comprised of a polymer is of the formula

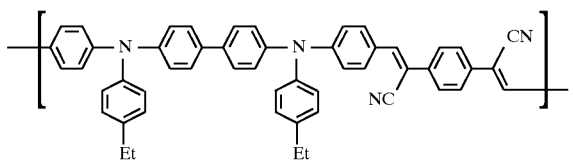

wherein the device emits orange red light with peak emission at about 590 nm, and for example, has a luminance of about 200 cd/mat at an applied voltage of 30 V.

In embodiments, the articles and devices employing polymer films of the present invention can be of a the thickness, for example, of from about 100 to about 1,000 nanometers. The polymer can be is present in the article or device as film or layer, for example from 1 to about 10 adjacent layers.

The present invention is directed to a printing machine comprising, for example, at least one display member, for example, as found in a user interface, or imaging member comprising an electroluminescent device as illustrated herein.

Preferred polymers and copolymers of the present invention are comprised of repeat units or mers selected, for example, from the formulas

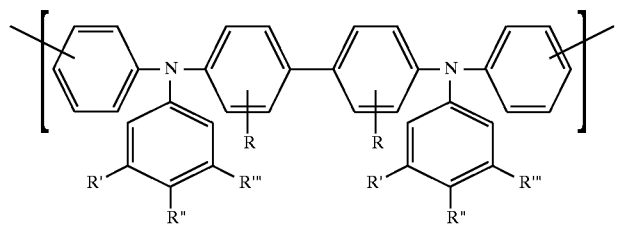

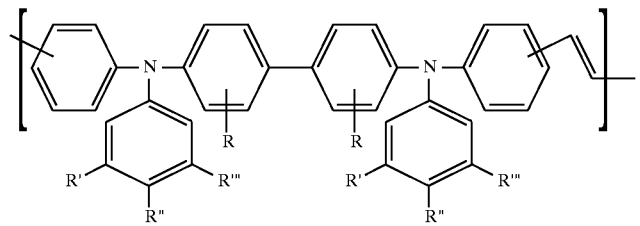

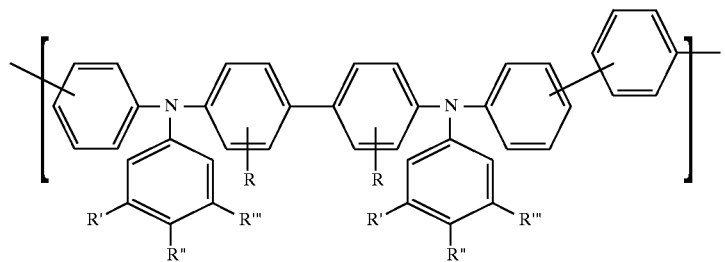

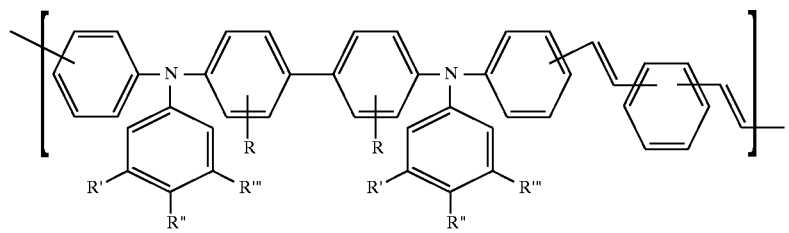

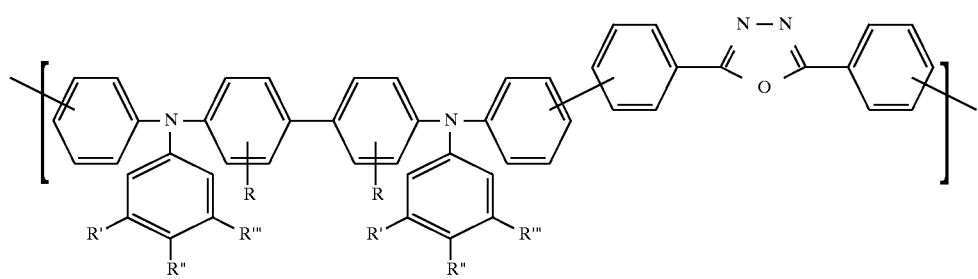

-continued
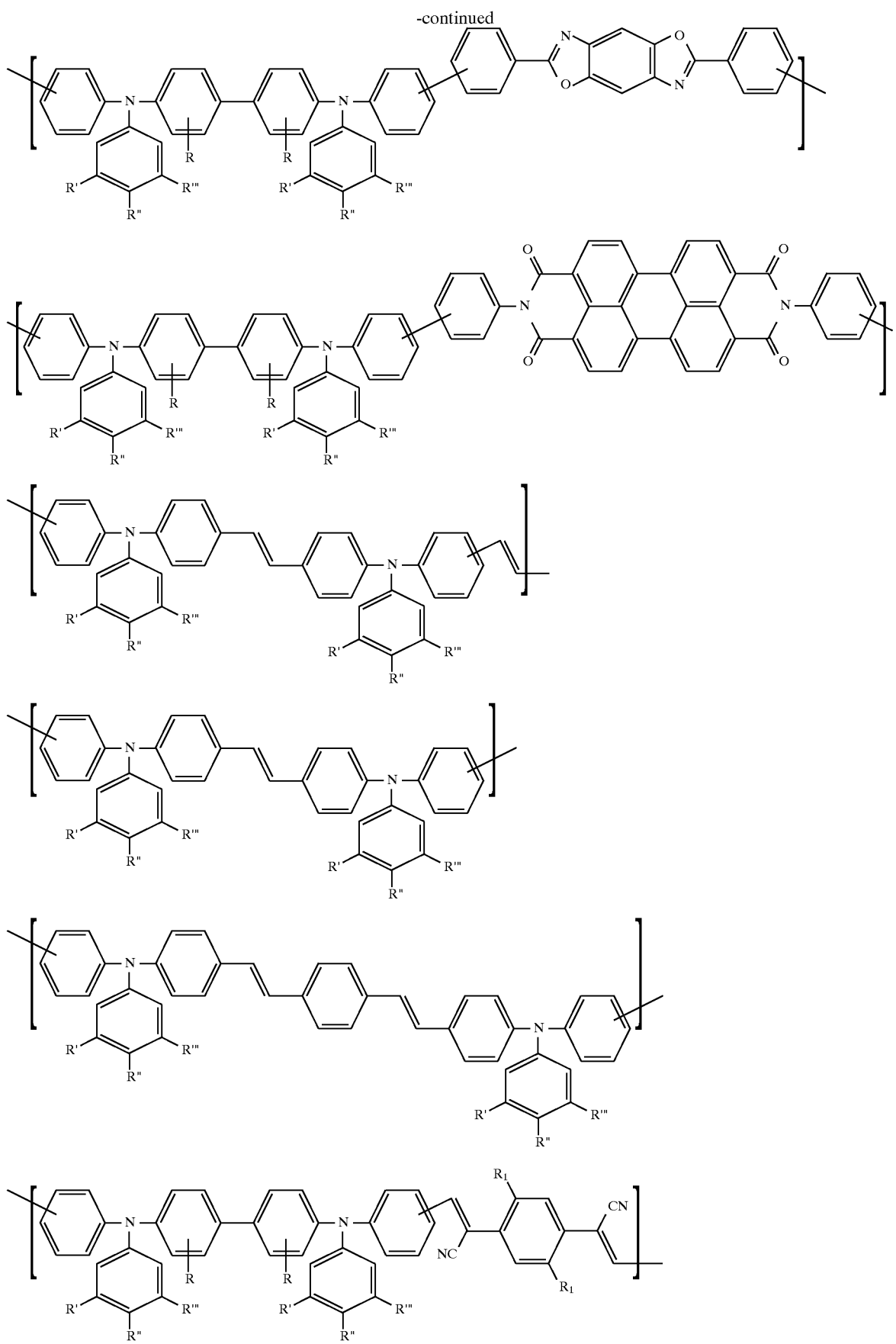

-continued
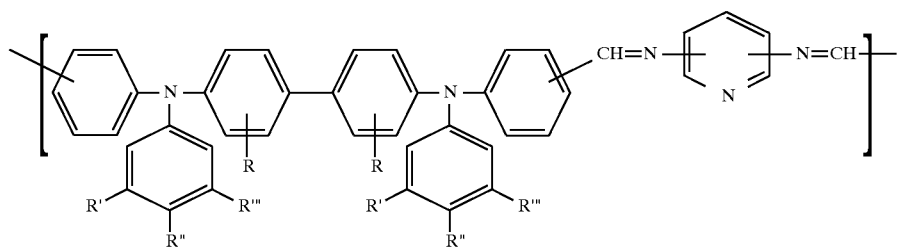
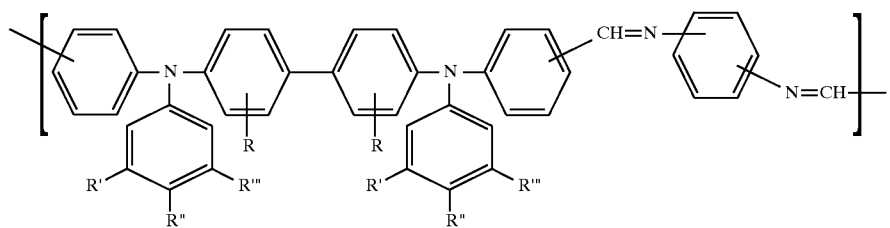
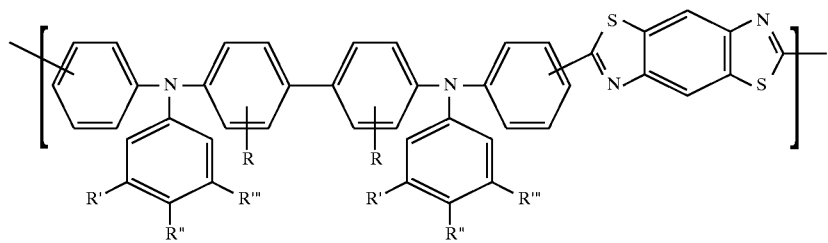
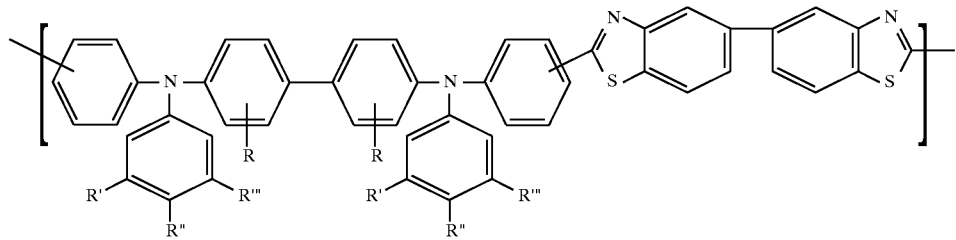
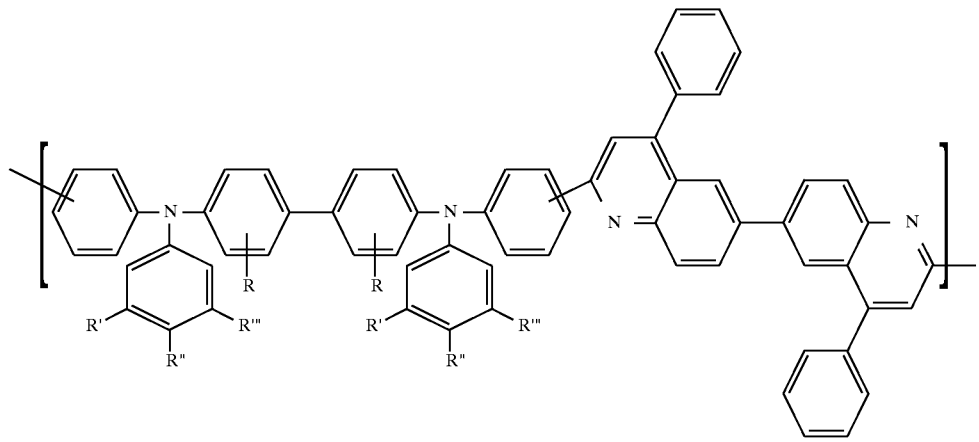

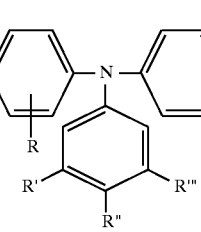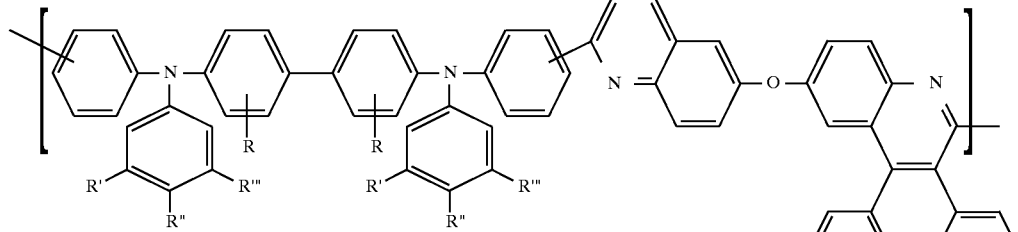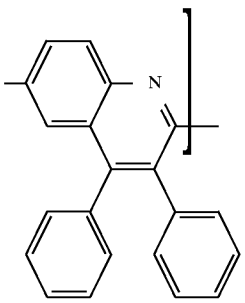
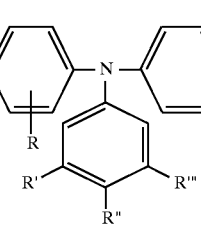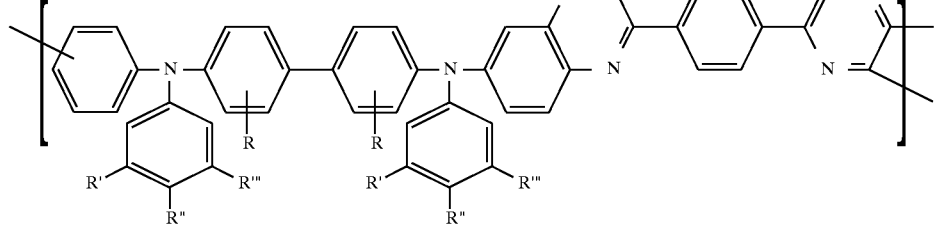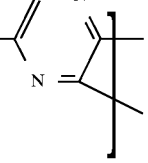
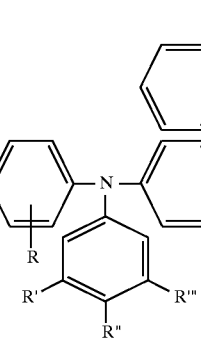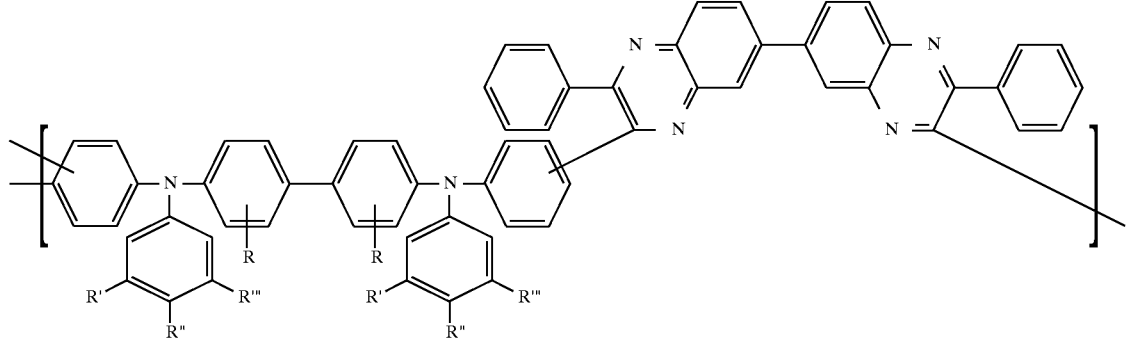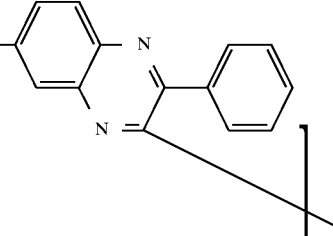
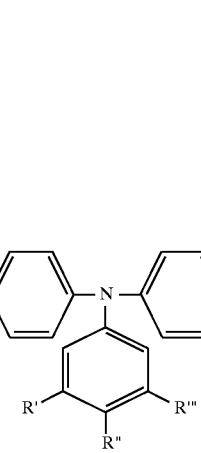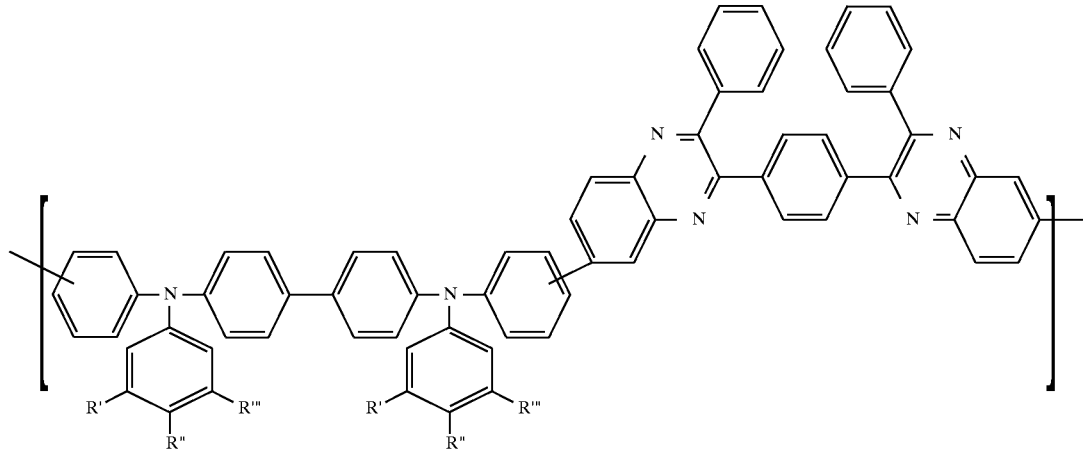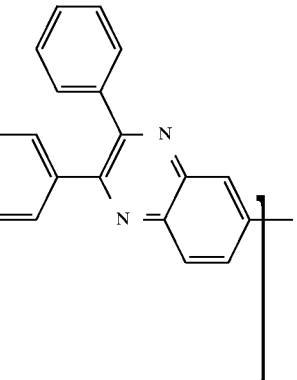
and

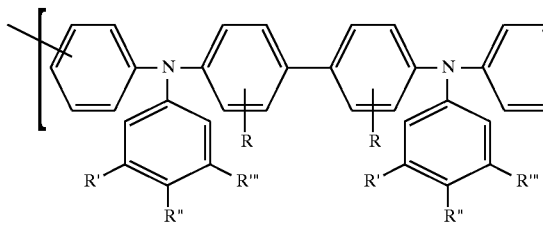
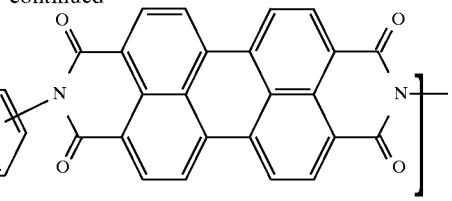

wherein R and $R_1$ are independently selected from H, methyl, ethyl, and methoxy; R' and R'" are independently selected from hydrogen, phenyl, or alkyl groups with 2 to about 24 carbon atoms, alkoxy groups with 1 to about 12 carbon atoms; R" is selected from halogens, phenyl, and alkyl groups with 2 to about 24 carbon atoms.

In embodiments, the present invention provides light emitting diode devices which can further comprise a dopant in the polymer selected from electron transport molecules, hole transport molecules, a charge transport compound and oxidized salts thereof, ionizable salts of ionomers and ionophores, an oxidant, light emitting compounds such as organic laser dyes, for organic light emitting diode applications, and mixtures thereof.

The conjugated charge transport polymers of the present invention can be prepared by coupling polymerization of a bistriarylamine (BTAA) containing monomer of the formula X—BTAA—X with a second monomer of the formula Y—USG—Y in the presence of a metal catalyst to from a conjugated charge transport polymer of the formula —[BTAA—USG]$_n$— wherein X and Y represent substitutents which are capable of undergoing coupling polymerization reactions and n is an integer of from 5 to 1,000 and represents the number of first and second monomers contiguously coupled. The X and Y substitutents, in embodiments, can be separately selected from the groups (a) a halogen and a trifluoromethylsulfonate, and (b) a boronic acid or boronic ester substituent, a trialkyltin substituent, a vinyl substituent, a terminal alkyne substituent, a trimethylsilylacetylene substituent, and a 2-methyl-3-butyn-2-ol group substituent; and the metal catalyst is a palladium compound, for example dichlorobis(acetonitrile)palladium (II), dichlorobis (benzonitrile)palladium (II), dichlorobis (triphenylphosphine)palladium (II), dichlorobis(tri-o-tolylphosphine)-palladium (II), palladium (II) acetate, palladium (II) chloride, tetrakis(triphenylphosphine) palladium (0), tris(dibenzylideneacetone)dipalladium (0), and mixtures thereof. Alternatively, X and Y substituents can be separately selected from the groups of (a) a halogen or trifluoromethylsulfonate, and (b) a CuBr, ZnBr or MgBr group, and the metal reagent is a nickel compound selected from the group consisting of bis(1,5-cyclooctadiene)nickel (0), [1,3-bis(diphenylphosphino)-propane]nickel (II) chloride, Ni(II) chloride-2,2'-bipyridine, Ni(II) bromide-triphenylphosphine, and mixtures thereof.

Preferred X—BTAA—X monomers are, for example, of the formulas

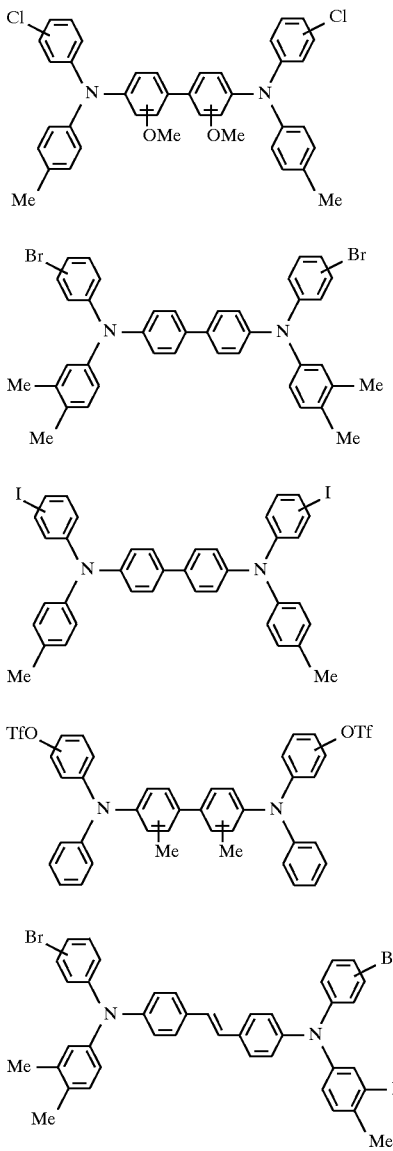

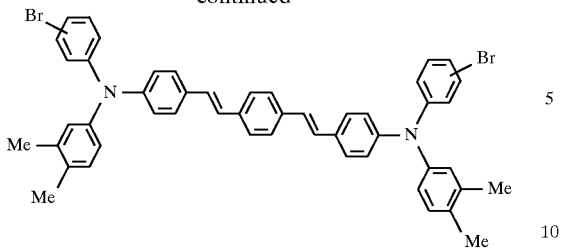 5
10
The readily available Y—USG—Y monomers can be, for example, of the formulas
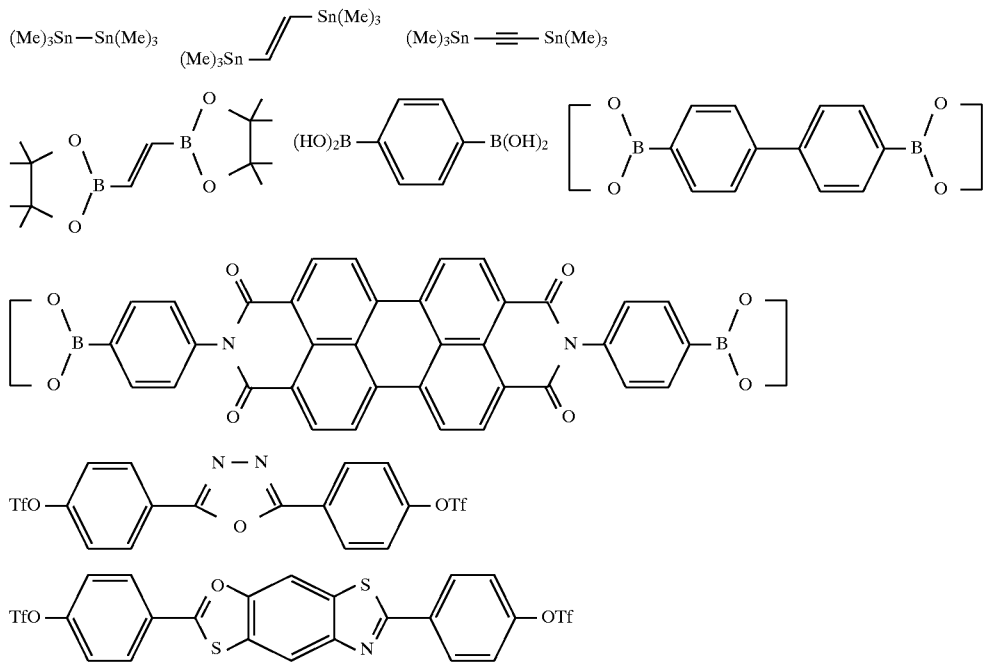
Preferred —[BTAA—USG]— type coupling polymers are, for example, of the formulas
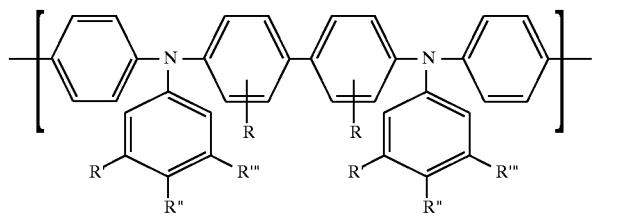
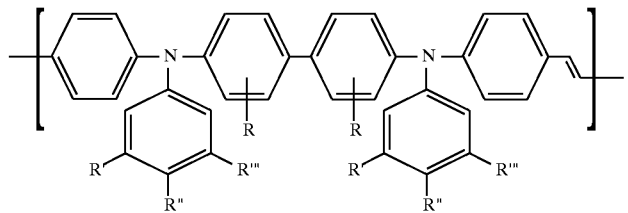

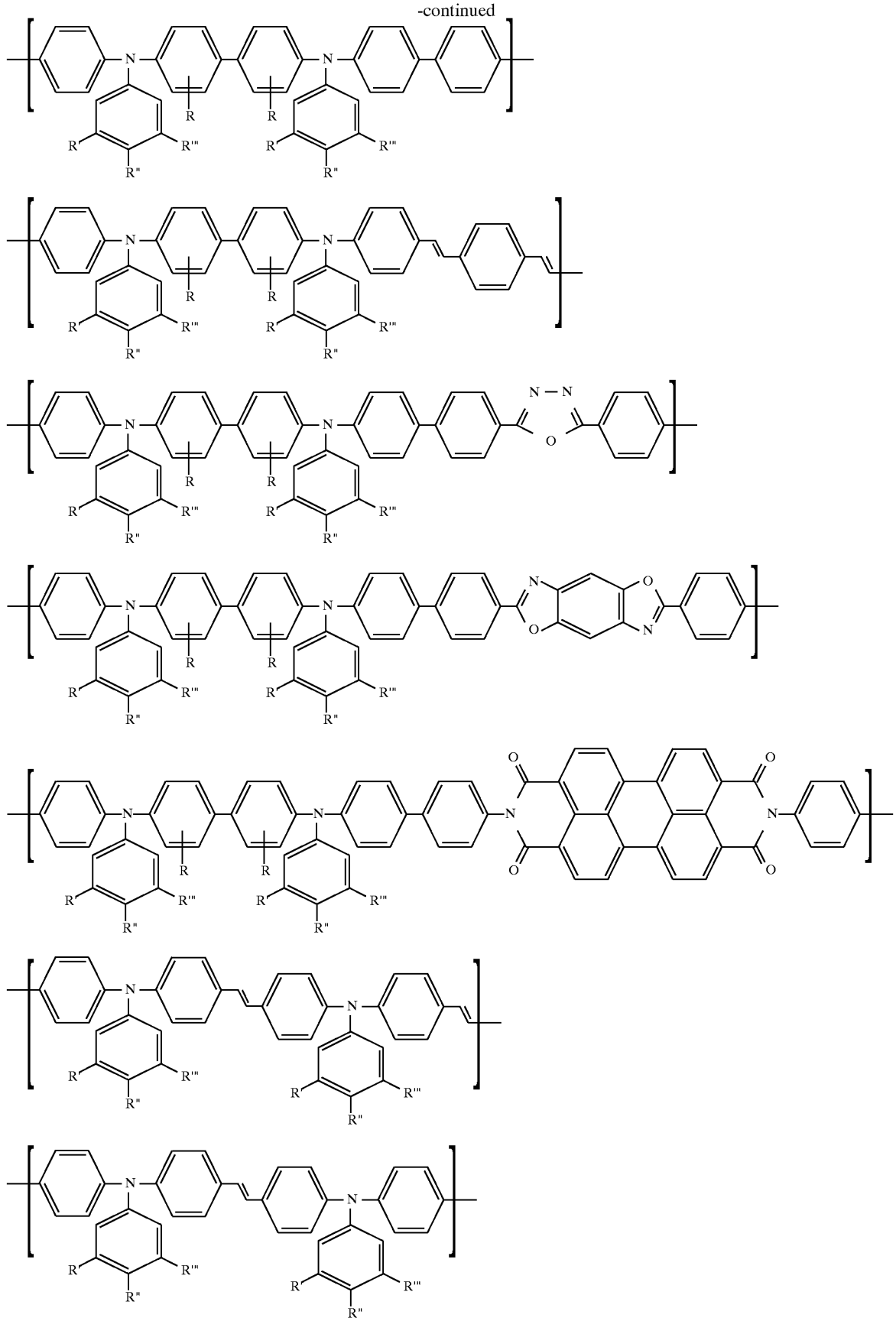

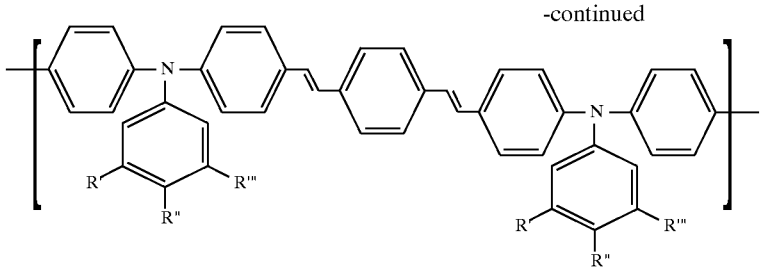

wherein R is selected from H, methyl, ethyl or methoxy; R' and R'" are independently selected from hydrogen, phenyl, or alkyl groups with 2 to 24 carbon atoms, alkoxy groups with 1 to 12 carbon atoms; and R" is selected from halogens, phenyl, or alkyl groups with 2 to 24 carbon atoms. The coupling polymerization conditions and procedures are disclosed, for example, in A. D. Schluter and G. Wegner, *Acta Polymer*, 44, 59–69 (1993).

The conjugated charge transport polymers of the present invention can be prepared by condensation polymerization of an equivalent molar amount of a bistriarylamine monomer of the formula X'—BTAA—X' with a monomer of the formula Y'—USG—Y' to form a condensation polymer of the formula

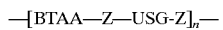

wherein X' and Y' represent condensation polymerizable groups, Z is vinylenes, arylenes, arylene substituted vinylenes, imines, phenylenes, quinolines, benzothiazoles, benzoxazole or benzimidazole groups, resulting from the condensation reaction of X' and Y', USG represents an unsaturated group, and n is an integer from 5 to about 1,000 and represents the number of first and second monomer pairs contiguously condensed.

Suitable condensation polymerization includes, but is not limited to, the Diels-Alder reaction, the Wittig reaction, the Knoevenagle reaction, imine condensation, quinoline condensation, benzothiazole condensation, benzoxazole condensation or benzimidazole condensation.

In the Diel-Alder type polymerization, the polymerizable group X' (or Y') is an to acetylene derivatives, and Y' (or X') is 2-pyrone or a 2-cyclopentadienone and the resulting Z is a phenylene derivative.

Preferred monomers are, for example, of the formulas

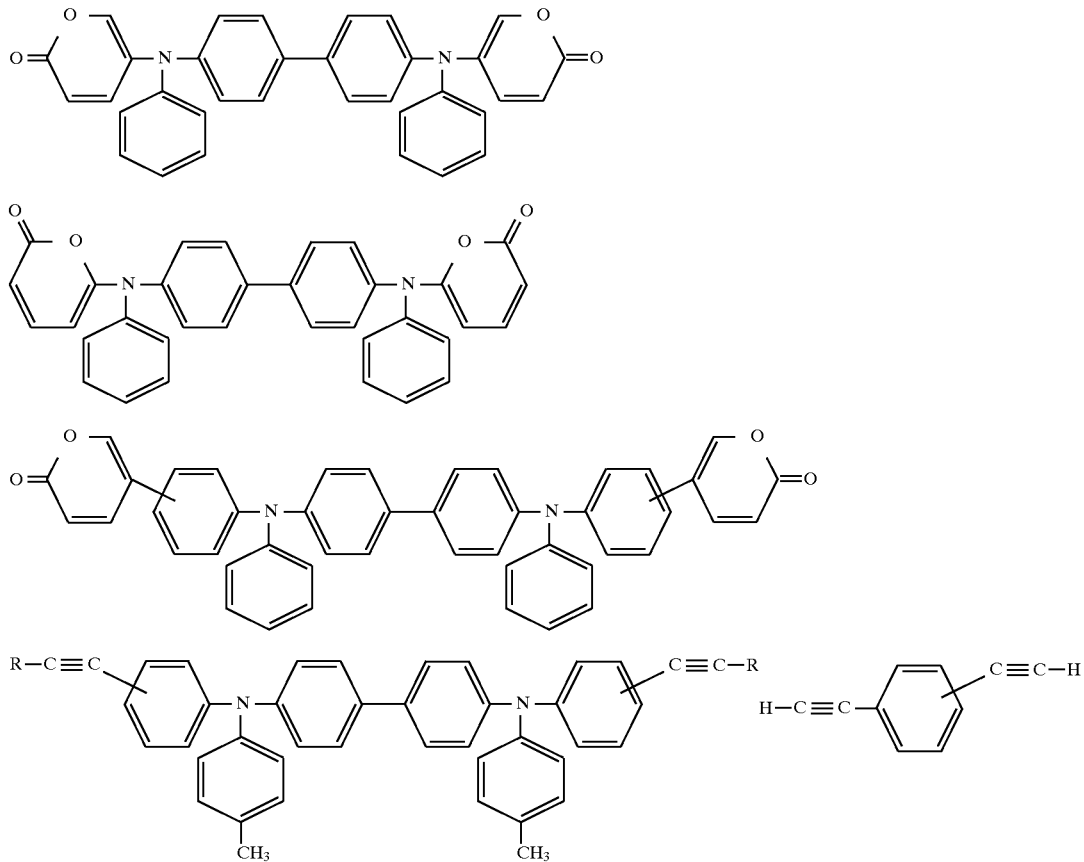

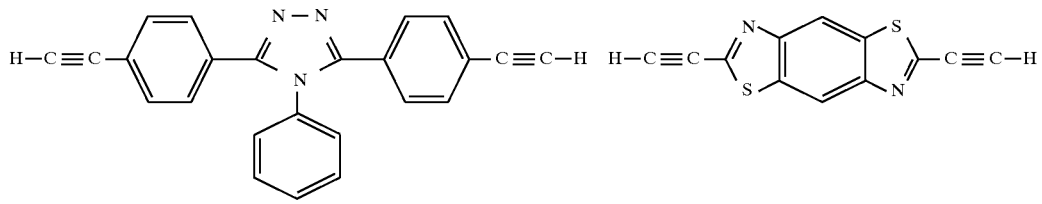

Preferred diamine oligomers and polymers are for example, of the formulas

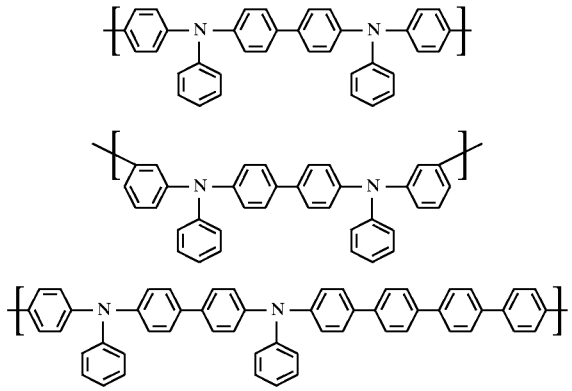

The procedures for the monomer synthesis and the Diels-Alder polymerization conditions and procedures are disclosed in, for example, J. N. Braham et al., *Macromolecules,* 11, 343–346 (1978); and H. F. VanKerckhoven et al., *Macromolecules,* 5, 541–546 (1972).

In the Wittig reaction, the polymerizable group X' is an aldehyde group and Y' can be selected, for example, from methyl phosphonic acid dialkyl esters, methyl triphenylphosphonium halides, methyl trisbutylphosphonium halides, and the like. The resulting Z group arises from the condensation is a vinylene group. Strong bases such as sodium methoxide, sodium ethoxide, potassium t-butoxide are generally required to effect the Wittig type polymerization. Preferred Wittig monomers are, for example,

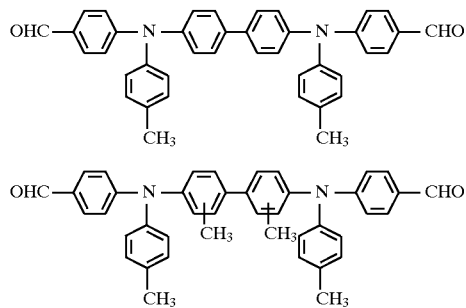

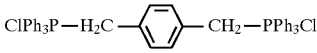

The resulting preferred polymers are, for example, of the formulas

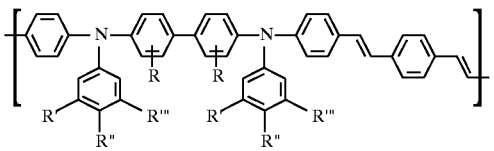

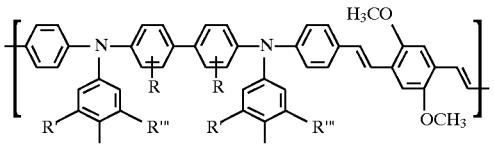

wherein R is selected from H, methyl, ethyl or methoxy; R' and R'" are independently selected from hydrogen, phenyl, or alkyl groups with 2 to 24 carbon atoms, alkoxy groups with 1 to 12 carbon atoms; and R" is selected from halogens, phenyl, or alkyl groups with 2 to 24 carbon atoms. The polymerization conditions and procedures based on the Wittig reaction can be found, for example, in U.S. Pat. No. 5,543,079.

In the Knovenagel type polymerization, the polymerizable group X' is a polymerizable aldehyde group and Y' can be selected from active methylene compounds, such as, —CH₂CN, —CH₂SO₂Ph, —CH₂CF₃ and the like groups containing electron withdrawing substituents. The resulting Z group arises from the condensation of X' and Y' and is, for example, a —CN, SO₂Ph or —CF₃ substituted vinylene group. Strong bases such as sodium methoxide, sodium ethoxide, or potassium t-butoxide are generally required to effect the Knovenagel type polymerization.

The preferred monomers for such polymerization are, for example, of the formulas

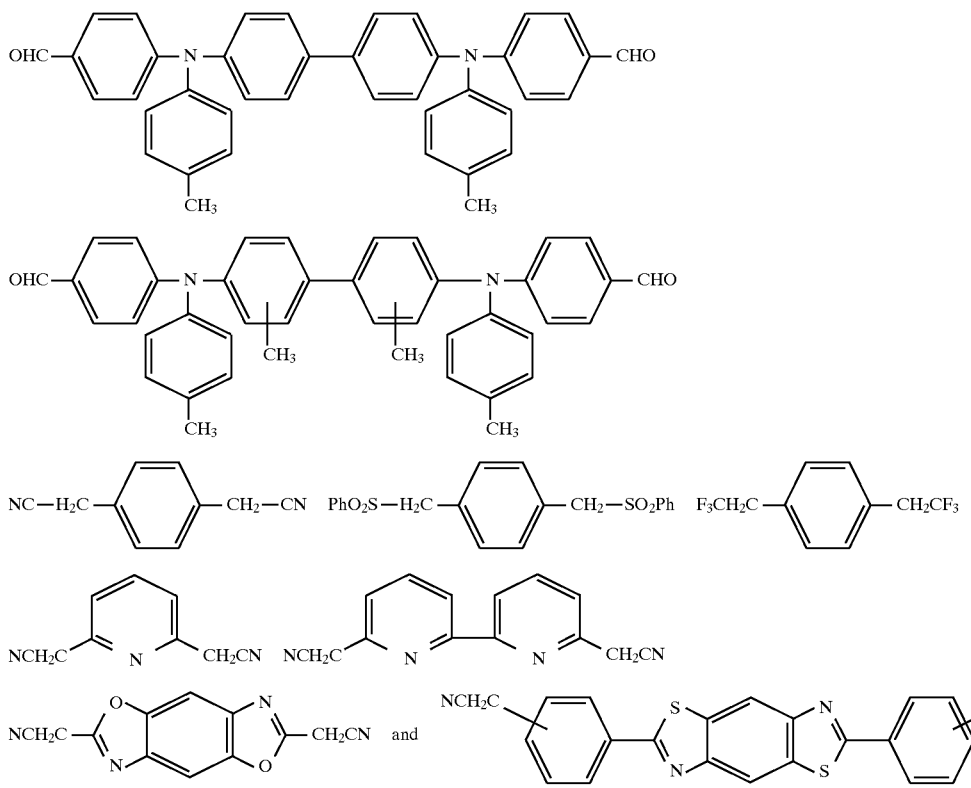

The preferred polymers resulting therefrom are, for example, of the formulas and wherein R is selected from H, methyl, ethyl or methoxy; R' and R''' are independently hydrogen, phenyl, or alkyl groups with 2 to about 24 carbon atoms, alkoxy groups with 1 to about 12 carbon atoms; and R'' is selected from halogens, phenyl, or alkyl groups with 2 to about 24 carbon atoms. The polymerization conditions and procedures for the Knovenagel polymerization process are disclosed in, for example U.S. Pat. No. 5,514,878.

In the imine condensation polymerization, the polymerizable groups X' (or Y') is $NH_2$ and Y' (or X') is a CHO group. The preferred monomers for such polymerization are, for example, of the formulas

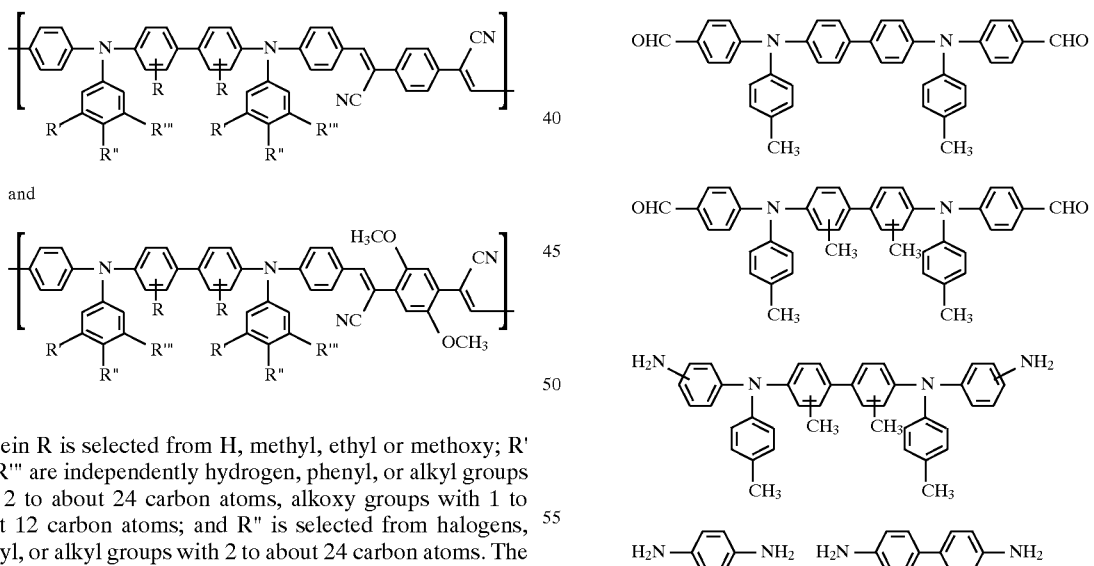

The imine polymers are, for example, of the formulas

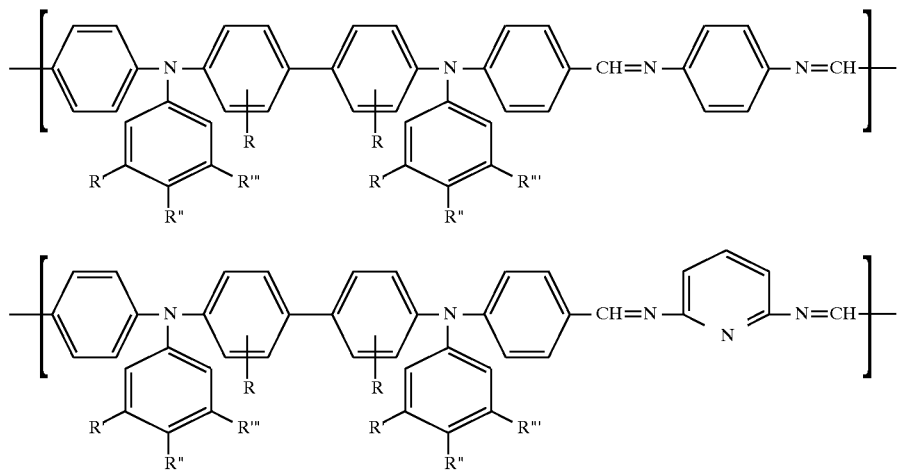

The polymerization conditions and procedures for the imine condensation polymerization procedure are disclosed, for example, in U.S. Pat. No. 5,236,980.

In the quinoline condensation polymerization, the polymerizable group X' is an acetyl or an phenacetyl group. The X'—BTAA—X' monomer can be, for example,

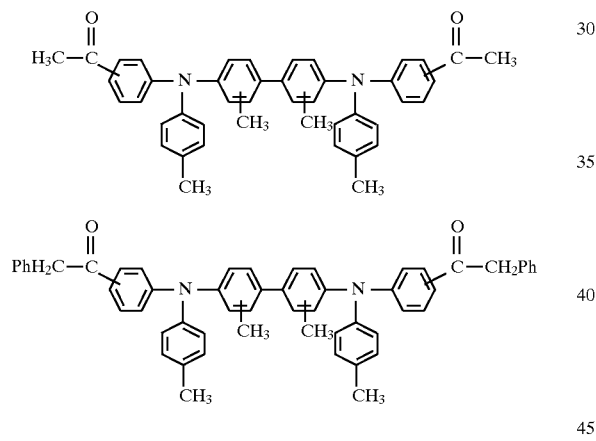

The Y'—USG—Y' monomers can be selected, for example, of the following compounds

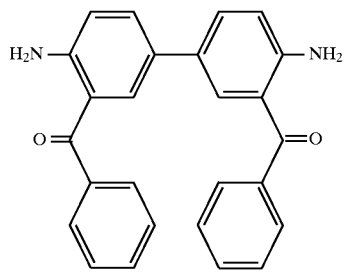

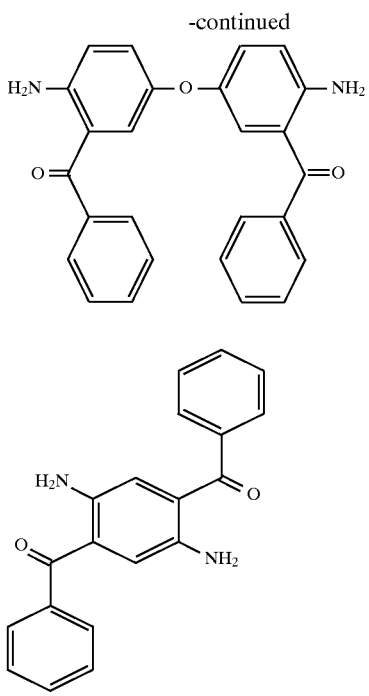

The polymerization conditions and procedure for the quinoline polymerization procedure can be found, for example, in: W. H. Beever and J. K. Stille, *Journal of Polymer Science*, Polymer Symposium 65, 41–53 (1978); and J. K. Stille, *Macromolecules*, 14, 870–880 (1981).

Preferred polymers are, for example, of the formula

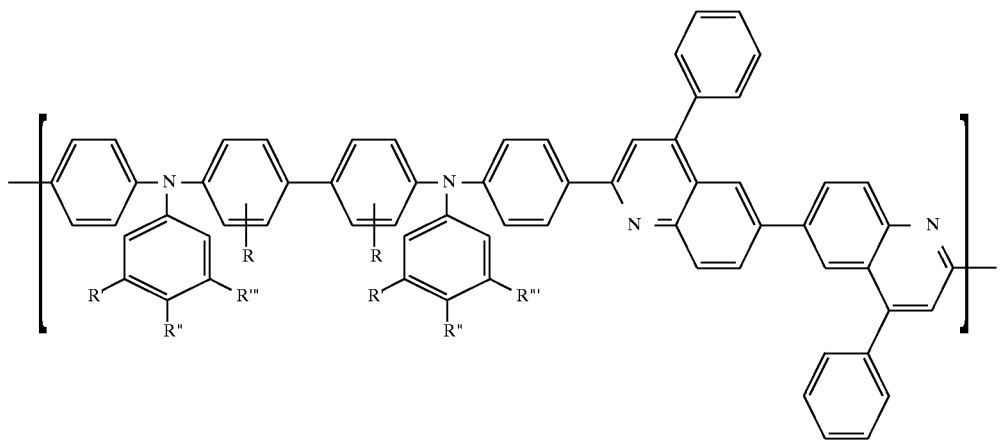
In the benzothiazole, benzoxazole or benzimidazole condensation polymerization, the polymerizable groups, X', is, for example, —COOH, —CN, —COOMe, and —COOC$_2$H$_5$.
The X'—BTAA—X' monomer can be, for example, of the formulas
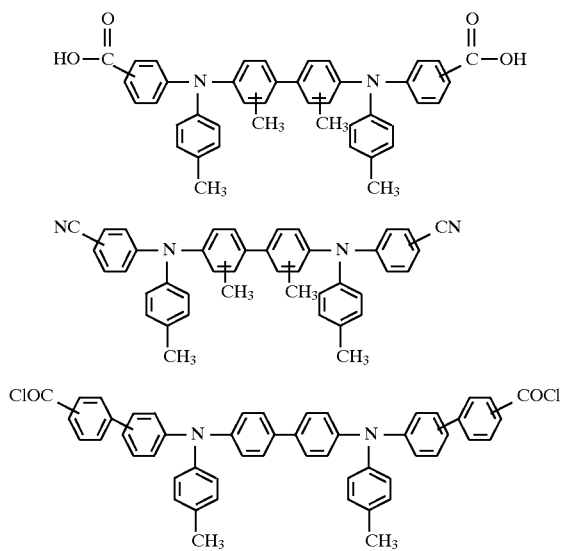
-continued
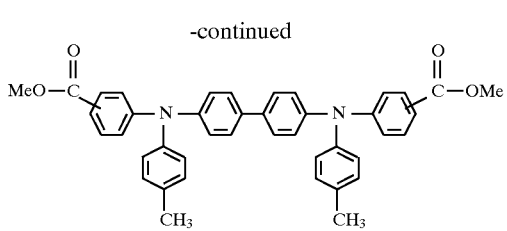
The Y'—USG—Y' monomer can be, for example, of the formulas
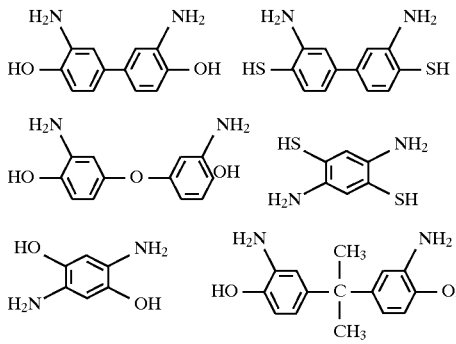
Preferred polymers are, for example, of the formulas
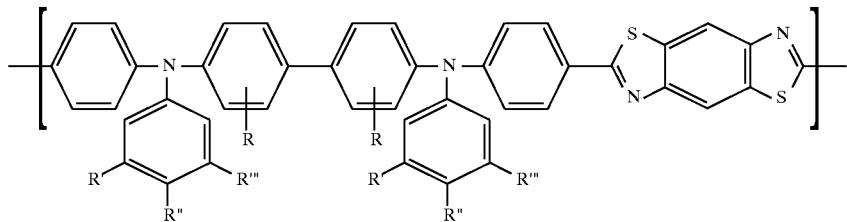

-continued

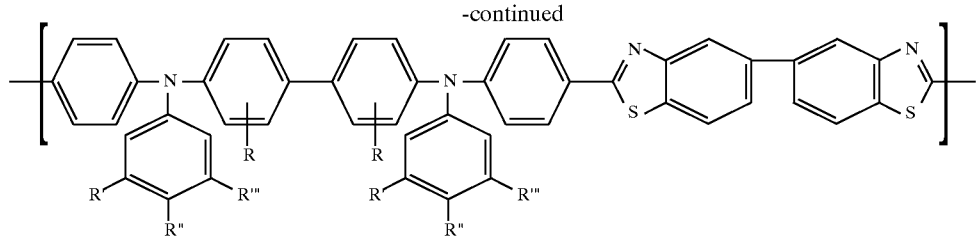

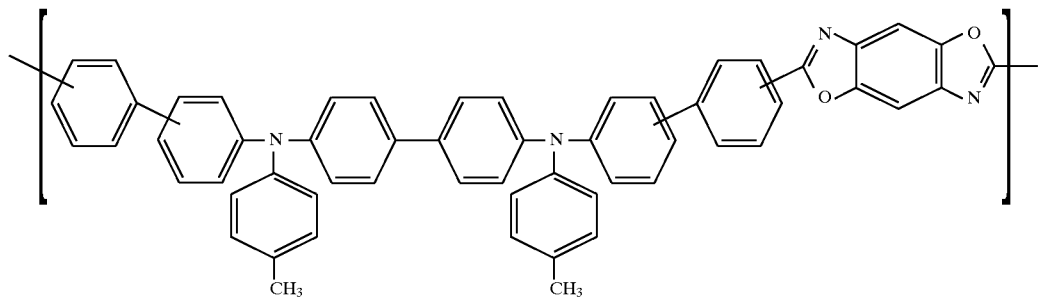

The polymerization conditions and procedures for the benzothiazole, benzoxazole or benzimidazole polymers can be found in: U.S. Pat. Nos. 4,533,693 and 5,599,899.

In the quinoxaline condensation polymerization, the polymerizable group, X', is, for example, —(NH2)2, or —CO—CO— group.

The X'—BTAA—X' monomer can be, for example, of the formulas

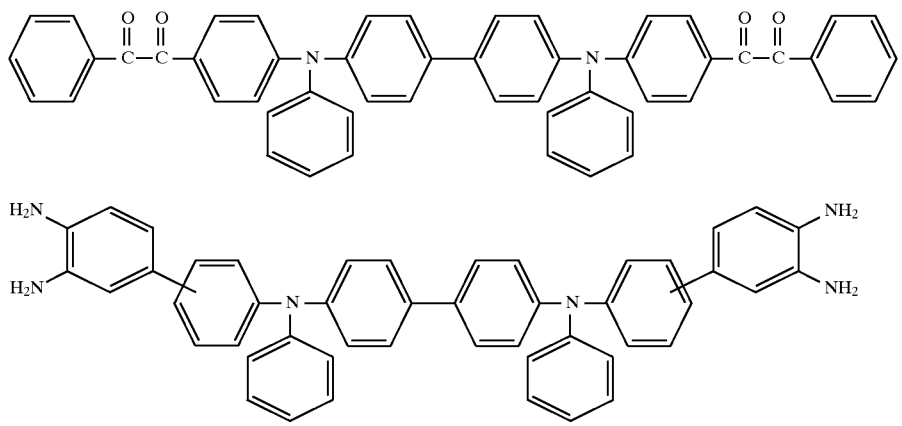

The Y'—USG—Y' monomer can be, for example, of the formulas

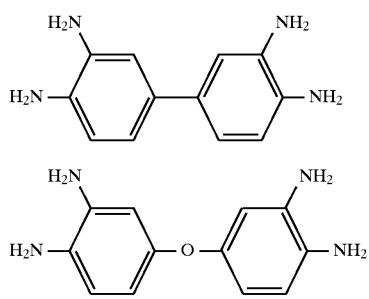

-continued

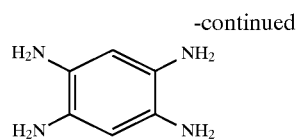

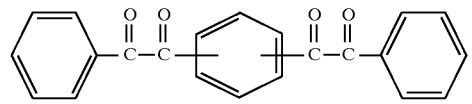

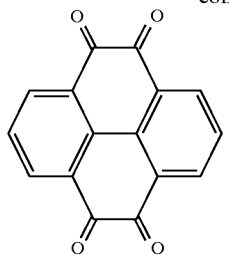
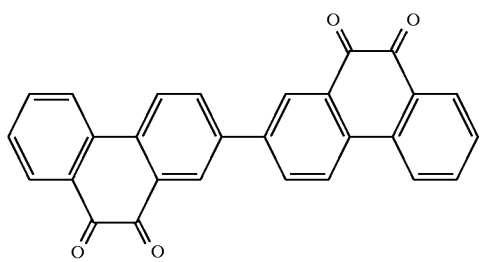
Preferred polymers are, for example, of the formulas
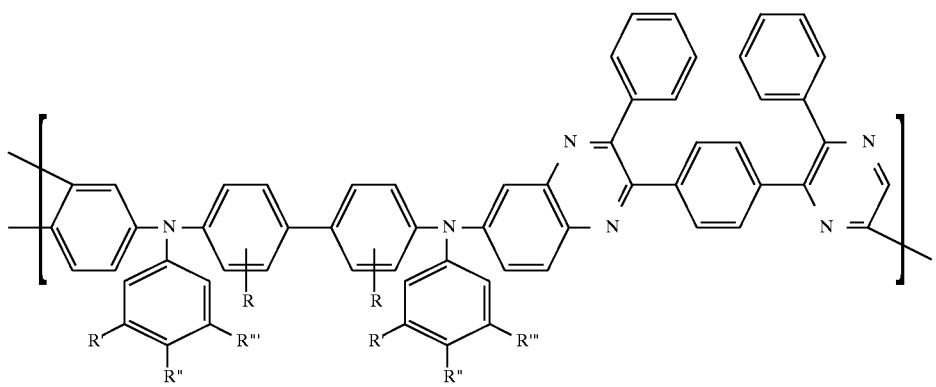
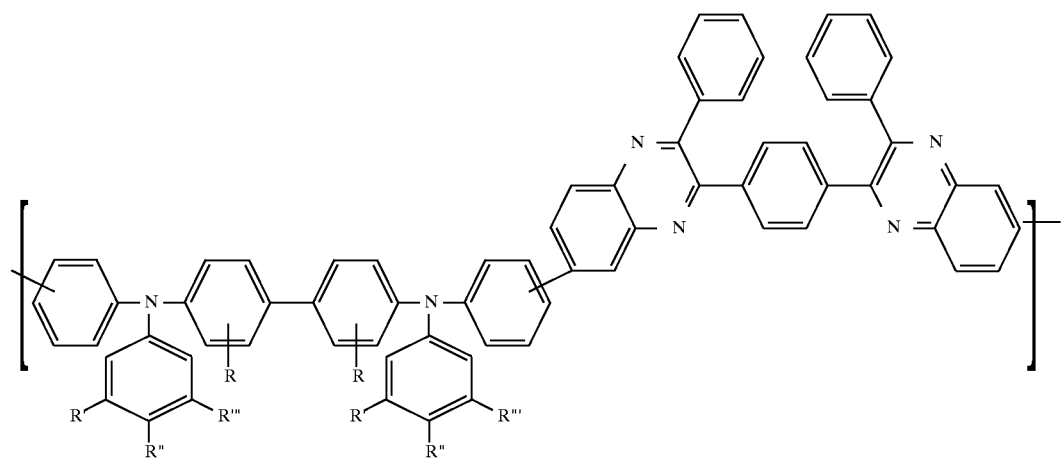

-continued

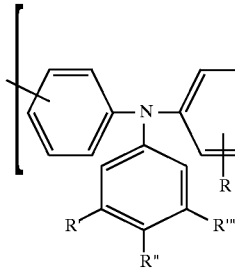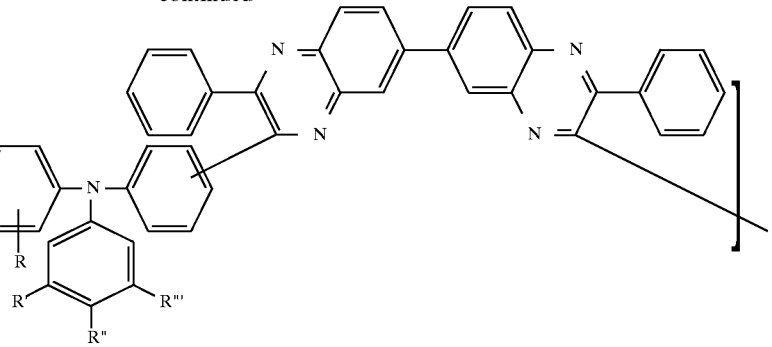

The polymerization conditions and procedures for the quinoxaline polymers can be found in "Thermally Stable Polymers" by Patrick E. Cassidy, Marcel Dekker, Inc., 1980.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated. All reagents were purchased from Aldrich Chemical Company and used without further purification.

The following examples are illustrative of the invention embodied herein. All amounts are by weight percent unless specified otherwise. Examples I–IV show the synthesis of charge transport monomers that are suitable for coupling polymerization in the presence of metal catalysts; Examples V shows the synthesis of dicarboxylic acid ester charge transport monomers that are suitable for the synthesis of heterocylic conjugated charge transport polymers via condensation polymerization. Example VI shows the synthesis of a dialdehyde charge transport monomer suitable for the Wittig and the Knovenagel type condensation polymerization. Example VII shows a conjugated charge transport polymer prepared via imine condensation reaction. Examples VIII and IX show the synthesis of conjugated charge transport polymers via the Wittig type condensation polymerization or the Knowvenagel type condensation polymerization. The electroluminescence of the resulting polymers were as indicated.

EXAMPLE I

Synthesis of N,N'-diphenyl-N,N'-di(m-chlorophenyl)-1,1'-biphenyl-4,4'-diamine:

Into a 250 mL three-necked round bottom flask equipped with a mechanical stirrer, thermometer with temperature controller and a source of argon gas were placed 3.4 grams of N,N'-diphenyl-[1,1'-biphenyl]-4,4,-diamine (3.4 g, 0.01 mol), potassium carbonate (5.6 g, 0.04 mol), 3-chloroiodobenzene (9.6 g, 0.04 mol) and copper powder (0.5 g). The mixture was heated with stirring for 24 hours. Using a water aspirator, the excess 3-chloroiodobenzene was removed by vacuum distillation. The product is isolated by the addition of n-octane (200 mL) and hot filtered to remove the inorganic solids. The deep orange filtrate was column chromatographed using Woelm neutral alumina with cyclohexane/benzene as eluent (3/2). The resulting oil was recrystalized from n-octane to yield colorless crystals of the product, mp=130°–132° C.

EXAMPLE II

Synthesis of N,N'-diphenyl-N,N'-di(p-chlorophenyl)-1,1'-biphenyl-4,4'-diamine

Into a 250 mL three-necked round bottom flask equipped with a mechanical stirrer, thermometer with temperature controller and a source of argon gas were placed N,N'-diphenyl-[1,1'-biphenyl]-4,4,-diamine (3.4 g, 0.01 mol), potassium carbonate (5.6 g, 0.04 mol), 4-chloroiodobenzene (9.6 g, 0.04 mol) and copper powder (0.5 g). The mixture was heated with stirring for 24 hours. Using a water aspirator, the excess 4-chloroiodobenzene was removed by vacuum distillation. The product was isolated by the addition of n-octane (200 mL) and hot filtered to remove the inorganic solids. The deep orange filtrate was column chromatographed using Woelm neutral alumina with cyclohexane/benzene as eluent (3/2). The resulting oil was recrystalized from n-octane to yield colorless crystals of the product, mp=147°–149° C.

EXAMPLE III

Synthesis of N,N'-diphenyl-N,N'-di(m-bromophenyl)-1,1'-biphenyl-4,4'-diamine

Diphenylbenzidine (8.00 g, 23.8 mmol), 1-bromo-3-iodobenzene (20.18 g, 71.33 mmol), powdered anhydrous potassium carbonate (32.86 g, 237.8 mmol), electrolytic copper powder (6.04 g, 95.1 mmol), and 18-crown-6 (1.33 g, 4.75 mmol) were refluxed in chlorobenzene (100 mL), under nitrogen for about 48 hours, until disappearance of the secondary amine, as indicated by TLC. Upon completion of the reaction, the copper and inorganic salts were removed by filtration of the hot reaction mixture. The solvent was evaporated and the pure product (7.3 grams, 48% yield) was isolated by column chromatography, using a 2.5:97.5 ethyl acetate:hexane solution as eluent.

EXAMPLE IV

Synthesis of N,N'-diphenyl-N,N'-di(m-trifluoromethanesulfonate phenyl)-1,1'-biphenyl-4,4'-diamine Into a 500 mL three necked round bottom flask was charged N,N'-diphenyl-N,N'-bis(3-hydroxyphenyl)-[1,1'-biphenyl]-4,4'-diamine (44.2 g, 85 mmol) and pyridine (200 mL). While cooled with an ice water/sodium chloride bath, trifluorosulfonic anhydride (50 g, 177 mmol) was added dropwise into the reaction mixture over 30 minutes. The bath was maintained at 5° C. during the addition. The reaction mixture was then stirred at room temperature over night and then diluted with 400 mL of toluene. The mixture was washed twice with water, twice with dilute aqueous hydrochloric acid, and again twice with water. The organic layer was dried over with magnesium sulfate. Solvent was evaporated under vacuum and the residual was applied to a column: of heptane/toluene (4:1) (500 mL), heptane/toluene (1:1) (500 mL), and toluene (500 mL) were used successively as eluent. The crude product was further purified by recrystallization from of heptane (300 mL) to give colorless title compound, in 50% yield, mp=100°–105° C.

EXAMPLE V
Synthesis of N,N'-diphenyl-N,N'-di(p-carbomethoxyphenyl)-1,1'-biphenyl-4,4'-diamine To a four neck 500 mL round bottom flask equipped with a mechanical stirrer, a thermometer, an argon inlet tube, and a water-cooled condenser above which was fixed the argon outlet tube (to a mineral oil bubbler) was charged of N,N'-diphenylbenzidine (42.8 g, 0.127 mol), methyl p-iodobenzoate (101.1 g, 0.36 mol), anhydrous potassium carbonate (70.32 g, 0.51 mol), copper bronze (38.2 g, Fisons organic synthesis grade), and Soltrol® 170 (80 mL, Phillips Petroleum, b.p. 210°–230° C.) as a diluent for the solid reactants. The reaction vessel was purged with argon to remove the bulk of the absorbed oxygen while mechanically stirring the solid bronze-colored paste for about 30 minutes. Thereafter a very gentle argon flow (a blanket) and slow mechanical stirring was maintained over the heated reaction contents until work-up of the cooled reaction mixture. Heating was provided with a heating mantle controlled by a voltage regulated rheostat. In the first 20 minutes, the internal reaction temperature of the bronze paste was increased from room temperature to 198° C., using a voltage setting of about 100 volts for the first 10 minutes and about 80 volts for the second 10 minutes. Without changing the voltage setting or any other reaction condition variables affecting temperature, the reaction mixture exothermed to 221° C. over the next 7 minutes and finally to 229° C. in another 7 minutes, wherein the voltage to the heating mantle was decreased to 70 volts in the second 7 minutes heating period. This temperature-voltage profile is indicative of a reaction exotherm characteristic of an Ullmann condensation. The voltage was further decreased to 65 volts and after an additional 20 minutes the temperature dropped to 219° C. The temperature was held in the 204°–213° C. range for an additional 21 hours at voltage setting of about 70–77 volts. After turning off the heat source, the reaction mixture was cooled to about 40°–50° C., and benzene (200 mL) was added and the mixture was refluxed with gentle mechanical stirring. This stirred extraction was repeated a second time. The combined benzene filtrates were dried over anhydrous magnesium sulfate. The magnesium sulfate was removed by vacuum filtration, and the filtrate was rotoevaporated to give a light yellow solid and a liquid (high boiling Soltro® 170) phase. After overnight (16 hours) refrigeration of this mixture, the liquid was easily decanted from the solid cake adhered to the bottom of the flask. In this way the bulk, but not all, of the Soltro® 170 was removed. The solid was twice extracted with 100 mL of refluxing ether (1 hour each) to extract lower molecular weight organic materials, but not the product, which is largely insoluble in ethyl ether. After the final vacuum filtration, 42.4 grams (71 g, 92% yield) of the product was isolated, m.p.=193.5°–195.5° C.

EXAMPLE VI
Synthesis of N,N'-di(p-ethylphenyl)-N,N'-di(p-formyl phenyl)-1,1'-biphenyl-4,4'-diamine:

The starting material for the title compound N,N'-di(p-ethylphenyl)-N,N'-di(phenyl)-1,1'-biphenyl-4,4'-diamine was prepared in three steps as follow: In a 1 L flask, water (750 mL), p-ethylaniline (50 g, 0.41 mol) and conc. HCl (36 mL) were added. Acetic anhydride (42 g, 0.41 mol) was then poured into the solution and then an aqueous solution of AcONa—3H$_2$O (109 g in 170 mL of water) was added. After the addition was complete, the mixture was stirred for 30 minutes, and then ice (500 g) was added. Resulting precipitates were separated by filtration and washed with water. The precipitates were dissolved into CH$_2$Cl$_2$ and washed with water. Organic layer was separated and dried over Na$_2$SO$_4$. Solvent was removed and the residue was recrystallized from MeOH to give p-ethylacetanilide (54.0 g, colorless needles, m.p.=94°–96° C.). In a 5 L three-necked round bottomed flask, p-ethylacetanilide (25 g), bromobenzene (31.2 g), potassium carbonate (25.4 g), copper powder (9.0 g) were added and refluxed for 120hours under an atmosphere of nitrogen. After the reaction was completed, the solution of KOH/EtOH (29.0 g of KOH in 130 mL ethanol) was added to the reaction mixture and heated to reflux for 1 hour. After the reaction was completed, the reaction mixture was cooled to about 25° C. and the precipitate was filtered. The filtrate was poured into water and extracted with CH$_2$Cl$_2$. Organic layer was thoroughly washed with water and the solvent was removed under reduced press (183°–187° C./12 mmHg). The residue was distilled under reduced pressure to give N,N-phenyl-p-ethylphenylamine (17.7 grams) as a pale yellow solid (m.p.=90°–93° C.). In a 500 mL-three-necked round bottomed flask, N,N-phenyl-p-wthylphenylamine (16.5 g), 4,4'-diiodobiphenyl (15.4 g, 0.052 mol), potassium carbonate (15.8 g) and copper(II) sulfate pentahydrate(0.1 g) were added and then heated at 250° C. for 3hours under an atmosphere of nitrogen. The reaction mixture was cooled and 50 mL of toluene and 50 mL of n-Hexane were added. The mixture was filtered through activated alumina (150 g), eluted with the mixed solution of toluene/n-hexanes(1/1 by volume). The solvent was removed and the residue was recrystallized from toluene/acetone to afford N,N'-di(p-ethylphenyl)-N,N'-di(p-phenyl)-1,1'-biphenyl-4,4'-diamine as pale yellow powder (11.4 g, m.p. 156.5°–157.5° C.). To a three necked round bottom flask equipped with a condenser, addition funnel and an argon inlet was added N,N'-di(p-ethylphenyl)-N,N'-di(p-phenyl)-1,1'-biphenyl-4,4'-diamine (8.9 g, 16.4 mmol), methylene chloride (35 mL) and DMF (6 mL). To the resulting solution was added POCl$_3$ (4.5 mL) drop wise over about 30 minutes. The resulting mixture was refluxed for about 24 hours. Upon cooling methylene chloride (150 mL) was added and the solution was poured into water (150 mL). Potassium carbonate (35 g) was added and stirred for 1 hour. The organic layer was separated and washed with water (100 mL), followed by drying over sodium sulfate and concentrating in vacuo to give a solid (11.4 g). This was recrystallized from hexanes/methylene chloride to give a light yellow solid (7.8 g, 79.6% yield).

EXAMPLE VII
A conjugated charge transport polymer via Imine condensation polymerization Into a 50 mL flask was added N,N'-di(p-ethylphenyl)-N,N'-di(p-formyl phenyl)-1,1'-biphenyl-4,4'-diamine (0.61 g, 1.01 mmol), p-phenylene diamine (0.11 g, 1.01 mmol), and lithium chloride (0.06 g). The mixture was stirred under nitrogen at room temperature at about 25° C. for 84 hours and then poured into methanol (200 mL). The precipitate was collected by suction filtration and air dried to give a yellow solid (0.6 g, 90%) with the following repeating formula

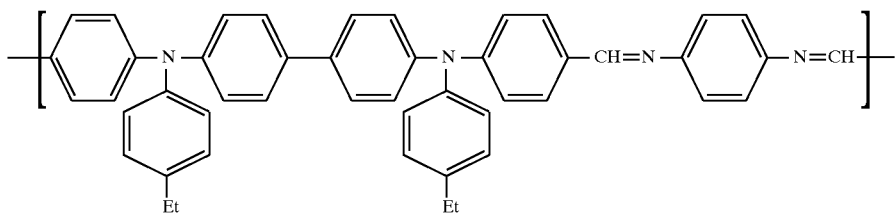

EXAMPLE VIII

A conjugated charge transport polymer via the Wittig reaction:

To a three neck flask equipped with a condenser was added N,N'-di-(p-ethyl-phenyl)-N,N'-di(p-formylphenyl)-1,1'-biphenyl-4,4'-diamine (0.61 gram, 1.01 mmol), p-xylene-bis(triphenyl-phosphonium bromide) (0.80 gram, 1.01 mmol), and 60 mL of ethanol/chloroform (v/v= 3/1). To this mixture was added dropwise sodium ethoxide solution (0.79 gram of 21% by weight in ethanol solution, 2.43 mmol). The reaction was stirred for 15 hours before 5 mL of 2% aqueous HCl was added to give a yellow precipitate. The crude product was collected by filtration and washed twice with 40 mL portions of an ethanol and water mixture (v/v=3/1, ). The solid was air dried 16 hours to give a yellow solid (0.60 gram, 99% yield) of the repeating formula:

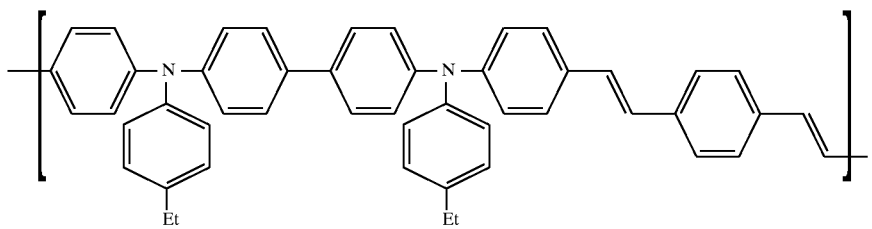

An electroluminescent device was prepared using the above prepared polymer as follow.

A 1% by weight solution of this polymer in chloroform was spin castled into a thin polymer film of about 500 nanometers thick on an indium tin oxide (ITO) glass substrate. A magnesium silver electrode was deposited in vacuum. The device emitted yellow green light with peak emission at about 530 nm with luminance of about 500 cd/mat at applied voltage of 25 V.

EXAMPLE IX

A conjugated charge transport polymer via the Knoevenagle reaction:

To a three neck flask equipped with a condenser was added N,N'-di(p-ethylphenyl)-N,N'-di(p-formyl phenyl)-1,1'-biphenyl-4,4'-diamine (0.31 gram, 0.51 mmol), 1,4-bis-cyanomethyl benzene (0.08 gram, 0.51 mmol), and 7.5 mL of THF. To this reaction mixture was added dropwise potassium t-butoxide (7.5 mL, 1M in THF). The reaction was stirred for 12 hours at 50° C., then 50 mL of tetra(t-butyl) ammonium hydroxide (1.0M in methanol) was added to give a viscous solution. The reaction mixture was poured into 400 mL of methanol with stirring. The resulting solid was collected by filtration and dried 12 hours to give an orange solid (0.12 gram, 30% yield) of the repeating formula

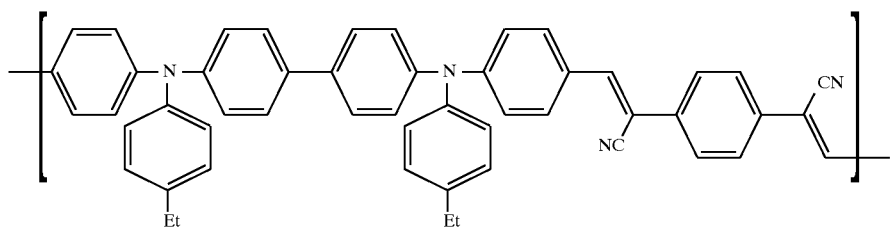

An electroluminescent device was prepared using the above prepared polymer as follow.

A 1% by weight solution of this polymer in chloroform was spin casted into a thin polymer film of about 500 nanometers thick on an indium tin oxide (ITO) glass substrate. A magnesium silver electrode was deposited in vacuum. The device emitted orange red light with peak emission at 590 nm with luminance of about 200 cd/mat at applied voltage of 30 V.

Other modifications of the present invention may occur to one of ordinary skill in the art based upon a review of the present application and these modifications, including equivalents thereof, are intended to be included within the scope of the present invention. The disclosures of each of the aforementioned patents and prior art references are totally incorporated herein by reference.

What is claimed is:

1. A charge transport polymer comprised of repeat units selected from the group consisting of the following formulas and mixtures thereof,

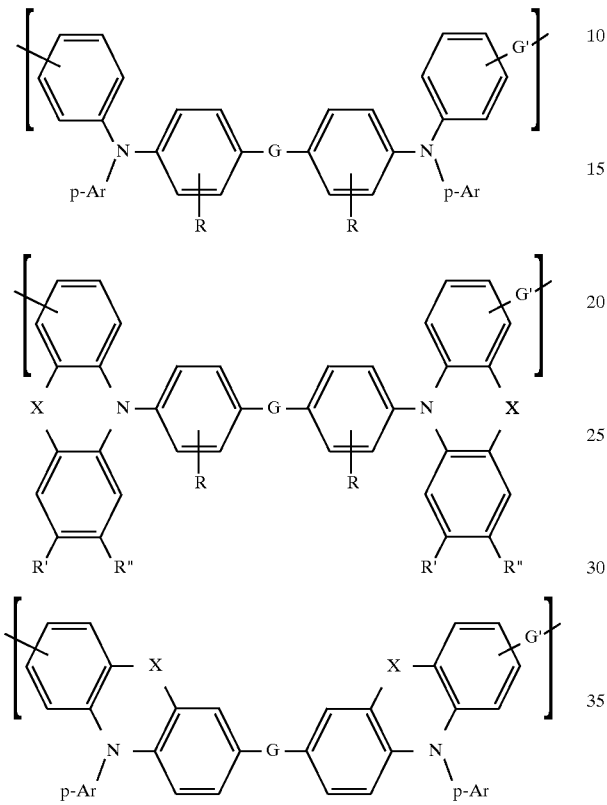

wherein G is nil, O, S, N—Ph, vinylene, acetylene, p-phenylene, m-phenylene, o-phenylene, or —CH=CH—Ph—CH=CH—; R is H, methyl, or methoxy; R' is an aryl group, an alkyl group, or an alkoxy group; R" is hydrogen, halogen, an aryl group, an alkyl group; X is nil, CH2, O, and S; p-Ar is a para-substituted aromatic group; and G' is an unsaturated double bond group.

2. A charge transport polymer in accordance with claim 1, wherein two or more different repeat units or mers are selected and wherein the polymer is a random or block copolymer.

3. A charge transport polymer in accordance with claim 2, wherein the copolymer contains from 2 to about 10 different mers are selected.

4. A charge transport polymer in accordance with claim 1, wherein R' is selected from aryl groups with for 6 to about 18 carbon atoms, alkyl groups with 2 to about 24 carbon atoms, and alkoxy groups with 1 to about 12 carbon atoms; R" is selected from hydrogen, halogens, aryl groups with for 6 to about 18 carbon atoms, and alkyl groups with 2 to about 24 carbon atoms; and p-Ar is a para-substituted aromatic group with for 6 to about 18 carbon atoms.

5. A polymer in accordance with claim 1, wherein the para-substituted aromatic group (p-Ar) is selected from the group consisting of the formulas

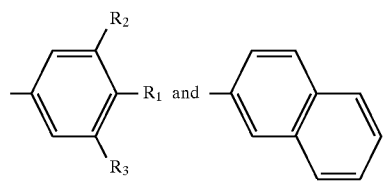

wherein $R_1$ is bromine, chlorine, fluorine, alkyl groups with from 1 to about 24 carbon atoms, and alkoxy groups with from 1 to about 24 carbon atoms; $R_2$ and $R_3$ are independently selected from hydrogen, bromine, chlorine, fluorine, alkyl groups with from 1 to about 24 carbon atoms, and alkoxy groups with from 1 to about 24 carbon atoms.

6. A polymer in accordance with claim 1, wherein the unsaturated G' group is selected from the formulas

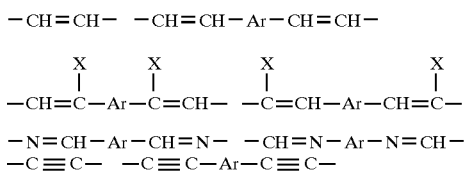

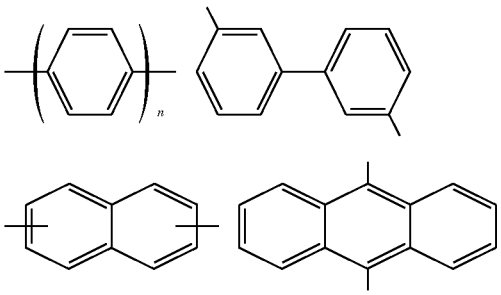

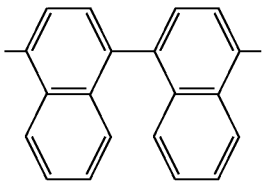

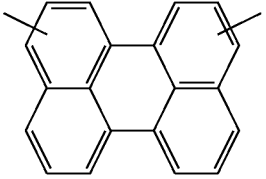

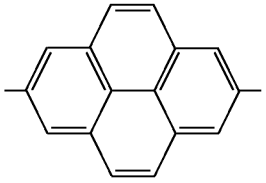

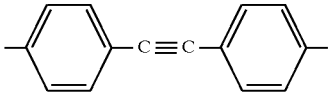

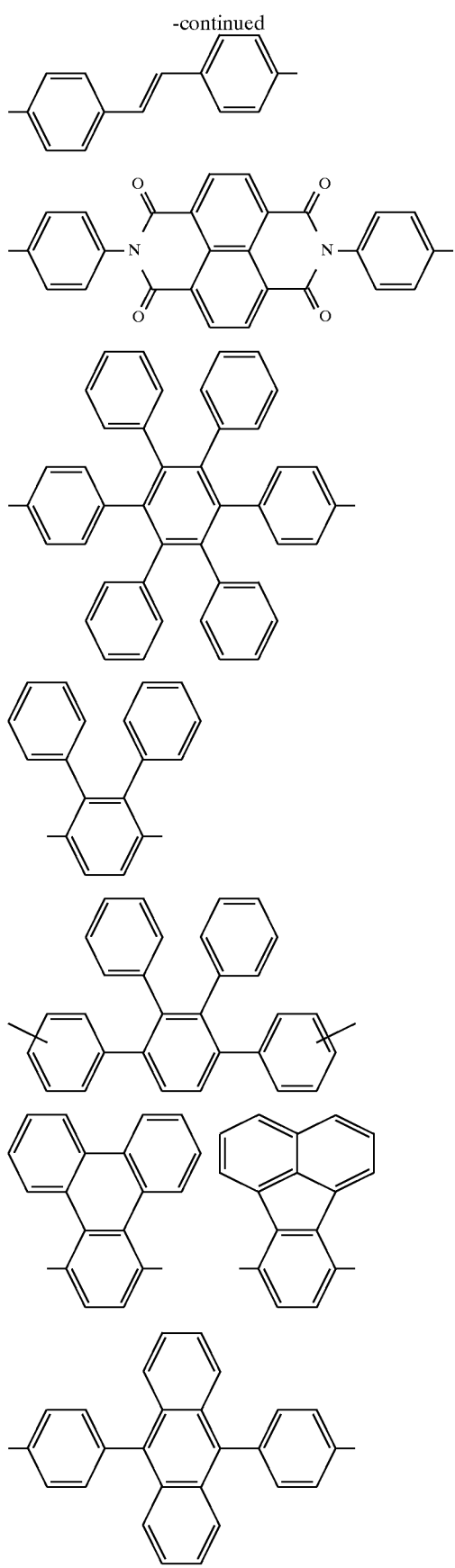
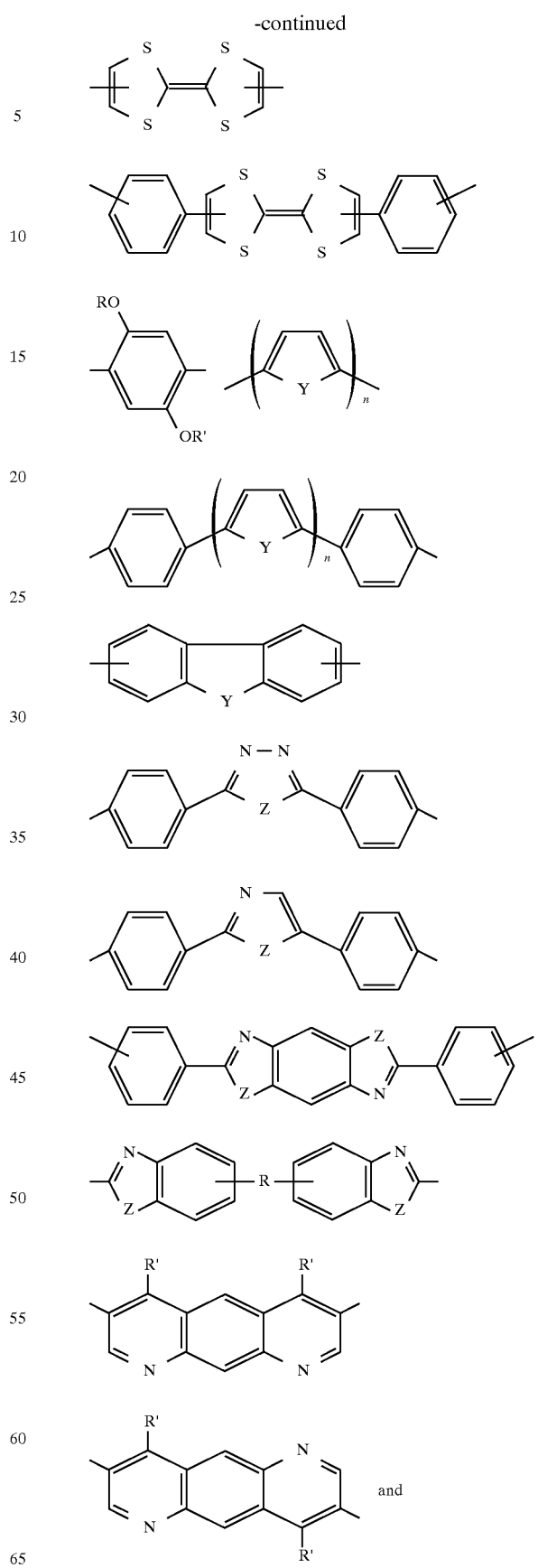

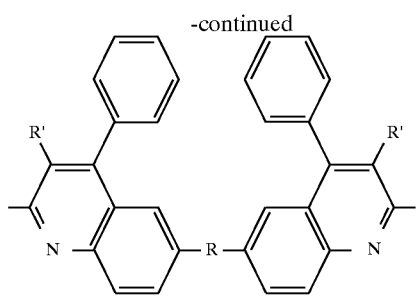

wherein X is an electron withdrawing group selected from cyano, trifluoromethyl, pentafluorophenyl, nitro, phenylsulfone, and alkylsulfone with 1 to about 10 carbon atoms; n is an integer from 2 to 6; Y is —CH$_2$—, C(Ph)$_2$, C(R)$_2$, O, S, NH, NR, and N—Ph, R is an alkyl group with 1 to about 12 carbon atoms and Ph is an aryl group with from 6 to about 18 carbon atoms; Z is O, S, NH, NR, and N—Ph wherein R is an alkyl group with 1 to about 12 carbon atoms and Ph is an aryl group with from 6 to about 18 carbon atoms; R is nil, O, C(CH$_3$)$_2$, vinylene, and phenylenes; R' is an alkyl group with 1 to about 12 carbon atoms or aryl group with from 6 to about 18 carbon atoms; and Ar is a divalent aromatic group.

7. A polymer in accordance with claim 6, wherein the divalent aromatic group (Ar) is selected from the formulas

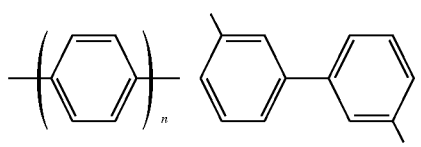

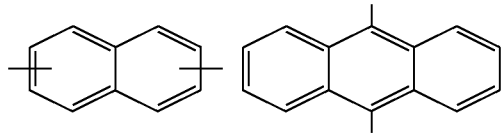

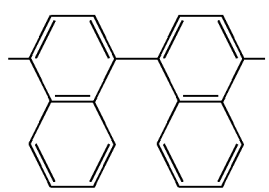

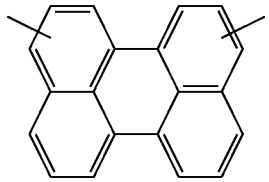

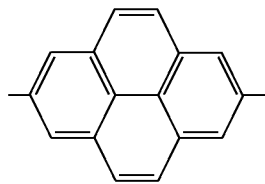

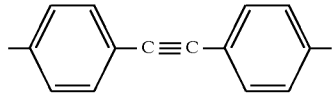

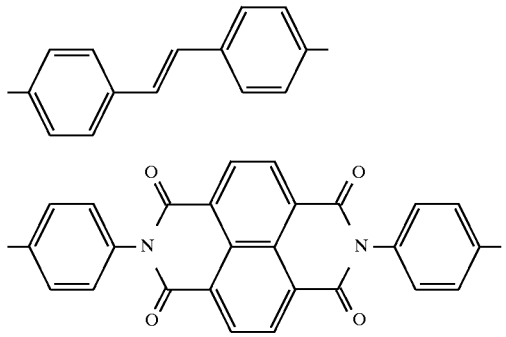

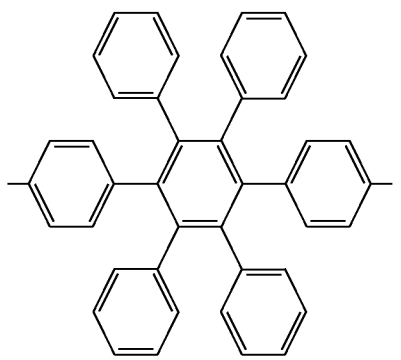

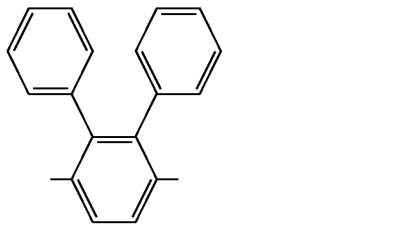

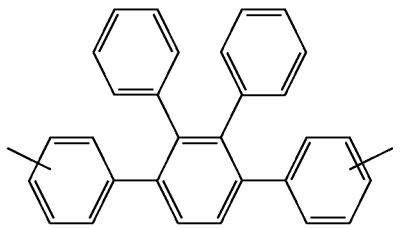

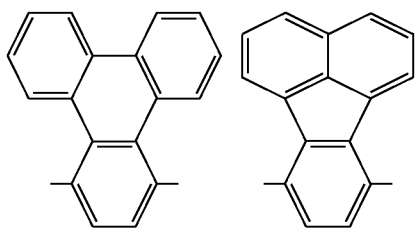

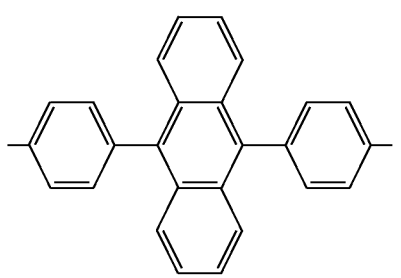

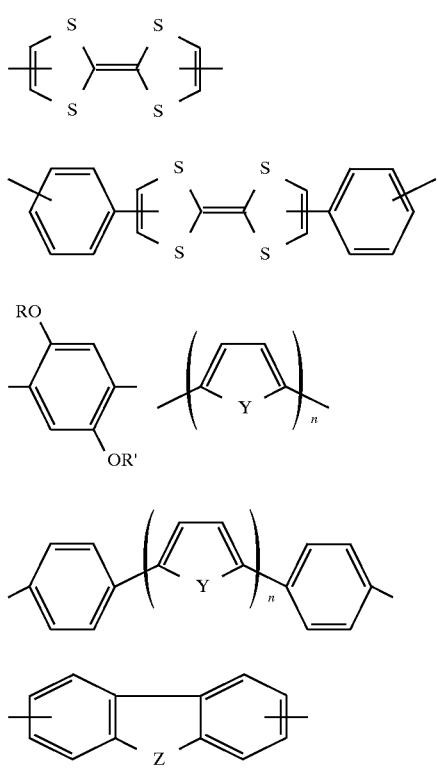
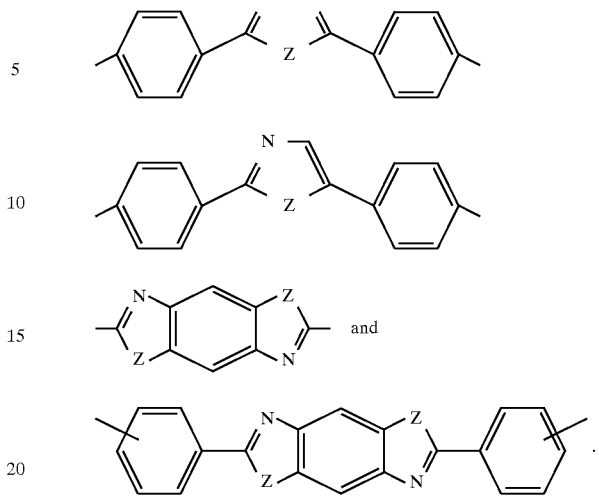
8. A polymer in accordance with claim 1, wherein the weight average molecular weight of the polymers are from about 3,000 to about 100,000, a number average molecular weight of from about 300 to about 10,000, and wherein the polymer or copolymer is soluble in organic solvents.
9. A charge transport polymer comprised of repeat units selected from the group of formulas
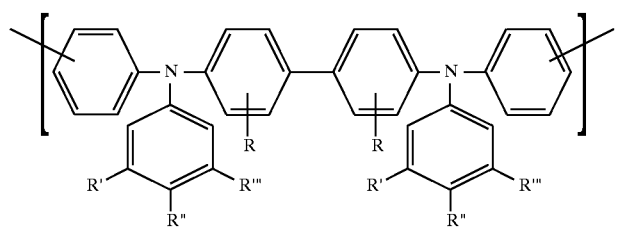
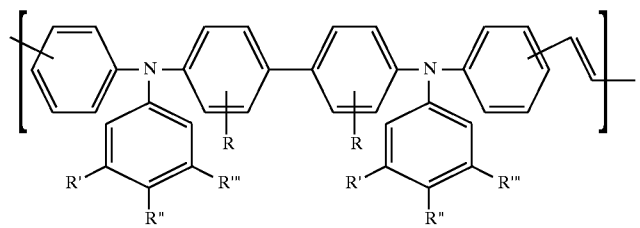
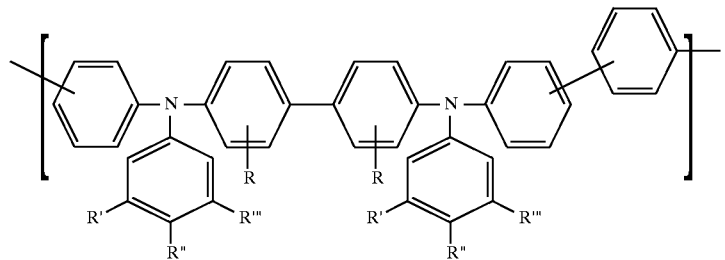

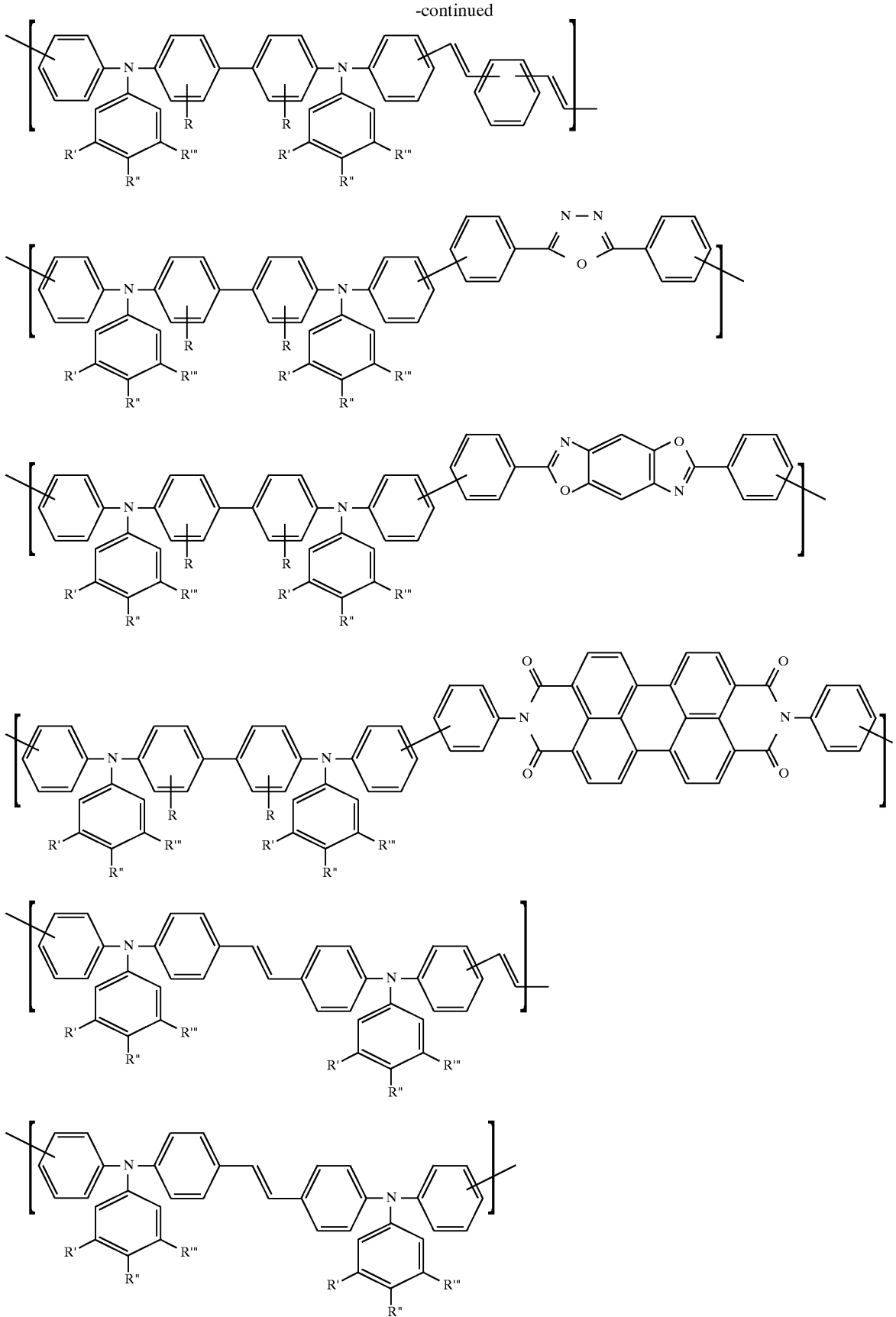

-continued
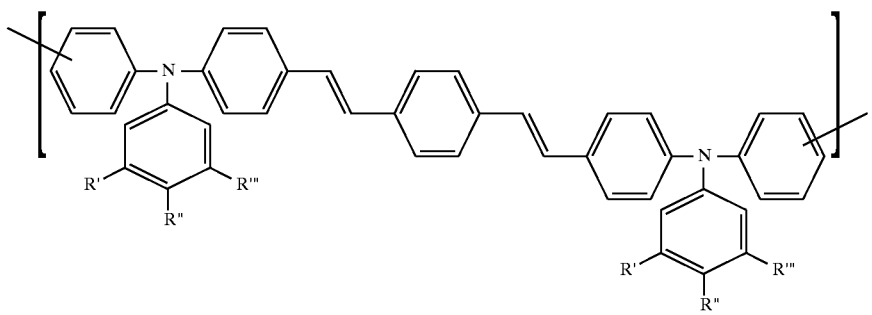
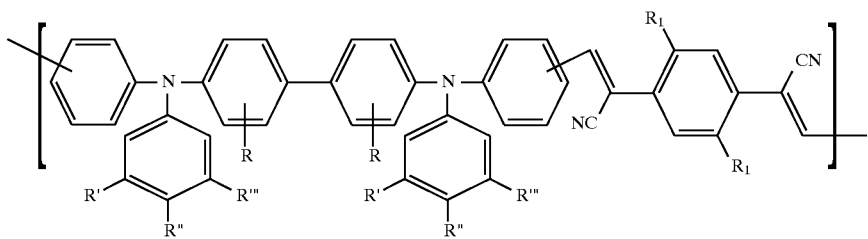
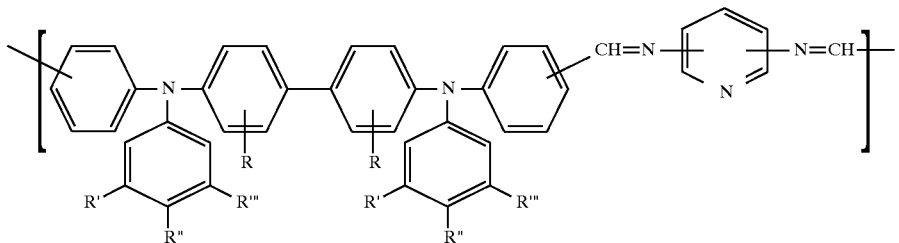
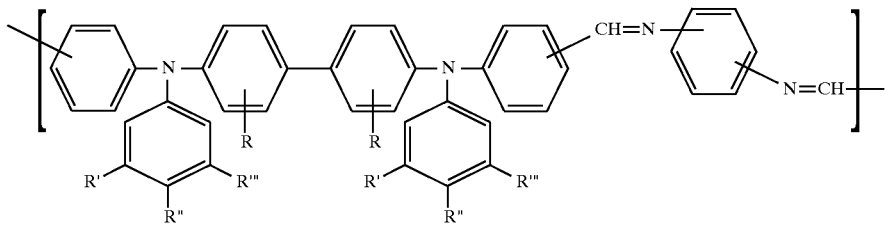
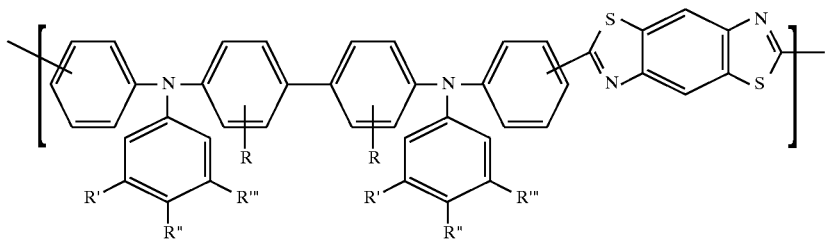
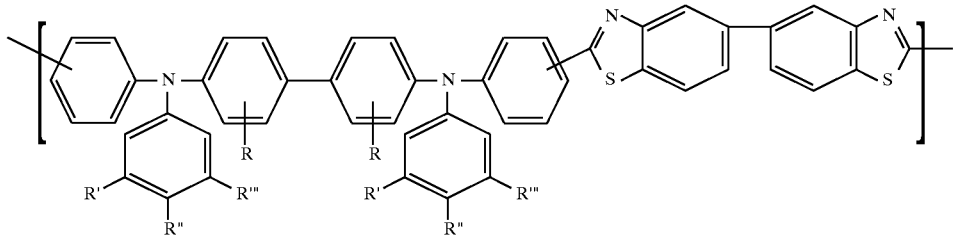

-continued
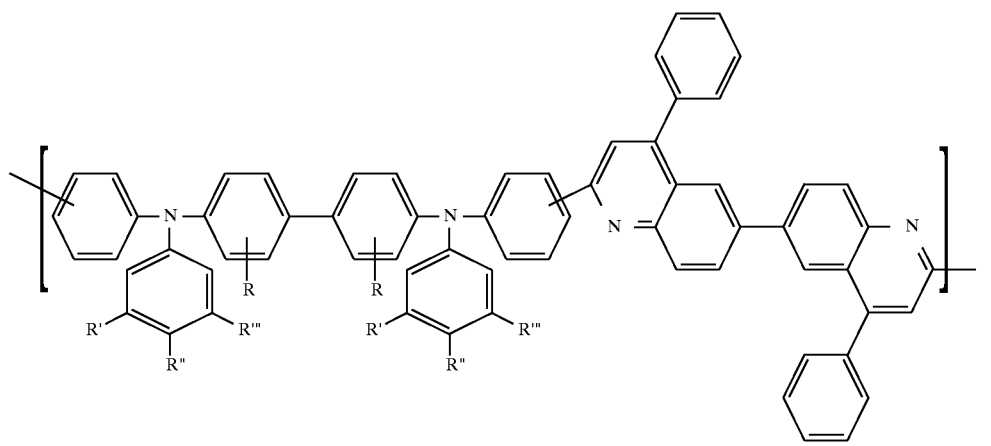
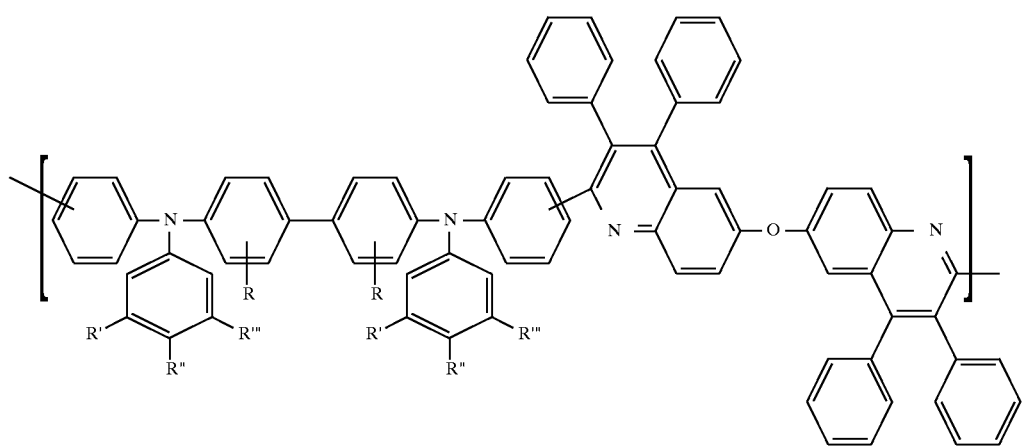
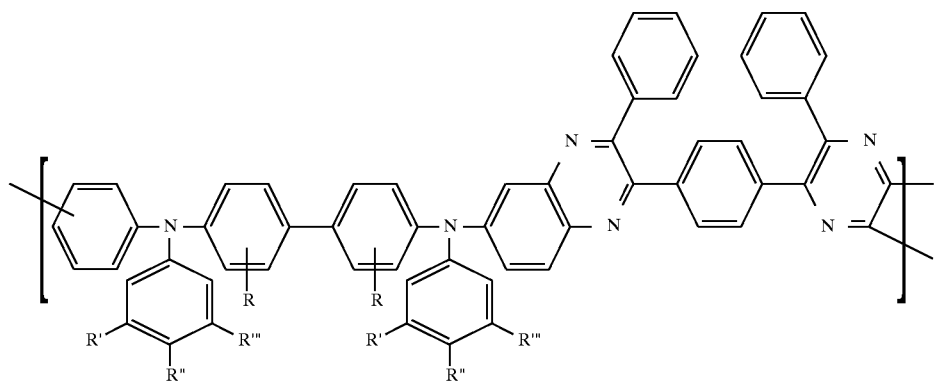

-continued

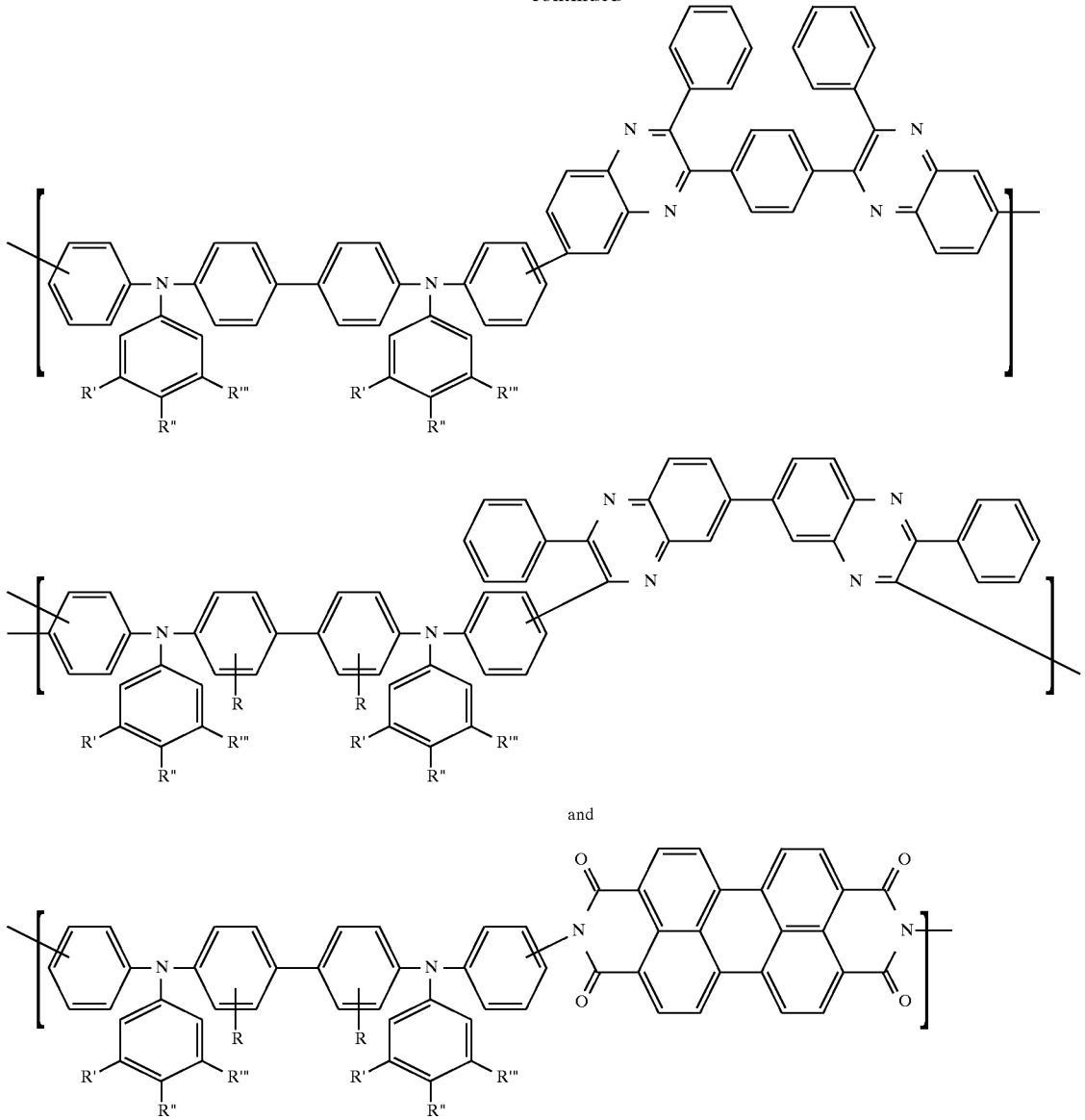

wherein R and $R_1$ are independently selected from H, methyl, ethyl, and methoxy; R' and R'" are independently selected from hydrogen, phenyl, or alkyl groups with 2 to about 24 carbon atoms, alkoxy groups with 1 to about 12 carbon atoms; R'' is selected from halogens, aryl groups with 6 to about 24 carbon atoms, and alkyl groups with 2 to about 24 carbon atoms.

10. An electroluminescent device comprised of an anode, a metal oxide, a charge transport layer, a charge injecting layer, an electron injecting layer, a electron transport layer, and a cathode, and wherein the charge transport layer contains a single layer or multilayer comprised of at least one of the polymers of claim 1.

11. An electroluminescent device comprised of an anode, a metal oxide, a charge transport layer, a charge injecting layer, an electron injecting layer, a electron transport layer, and a cathode, and wherein the charge transport layer contains a single layer or multilayer comprised of at least one of the copolymers of claim 2.

12. An electroluminescent device in accordance with claim 10, further comprising a dopant in the polymer selected from the group of electron transport molecules, hole transport molecules, a charge transport compound and oxidized salts is thereof, ionizable salts of ionomers and ionophores, an oxidant, light emitting compounds, and mixtures thereof.

13. An electroluminescent device in accordance with claim 10, wherein the polymer is of the formula

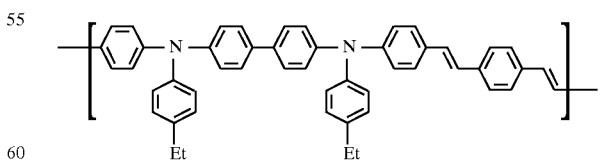

14. An electroluminescent device in accordance with claim 9, wherein the device emits yellow green light with peak emission at about 530 nm, has a luminance of about 500 cd/mat at an applied voltage of 25 V.

15. An electroluminescent device in accordance with claim 10, wherein the polymer is of the formula

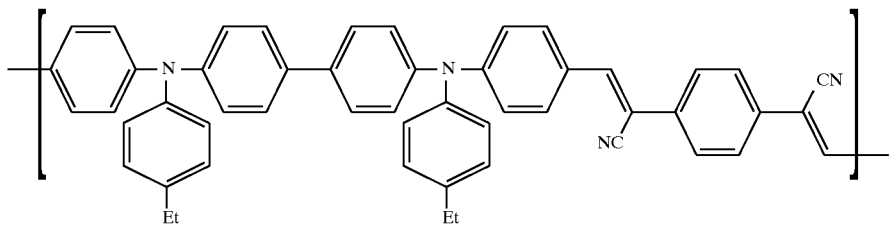

16. An electroluminescent device in accordance with claim 15, wherein the device emits orange red light with peak emission at about 590 nm, has a luminance of about 200 cd/mat at an applied voltage of 30 V.

17. An electroluminescent device in accordance with claim 10, wherein the thickness of the polymer film is from about 100 to about 1,000 nanometers.

18. An electroluminescent device in accordance with claim 10, wherein the polymer is present in from 1 to about 20 adjacent layers.

19. A printing machine comprising a display member or imaging member comprising an electroluminescent device in accordance with claim 10.

20. An electroluminescent device in accordance with claim 11, wherein the copolymer is a terpolymer of the formula

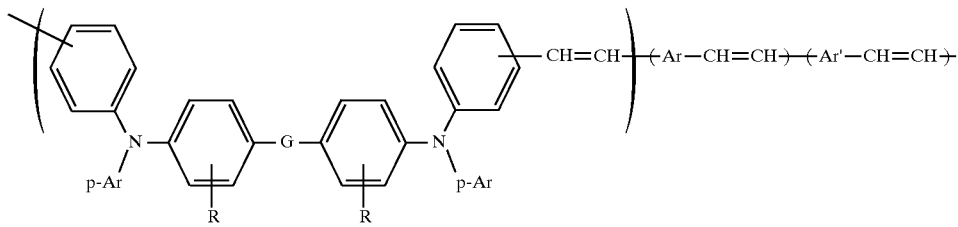

wherein Ar and Ar' are connecting divalent aromatic groups with from 6 to about 18 carbon atoms, p-Ar is a para-substituted aromatic group, and wherein G is nil, O, S, N—Ph, vinylene, acetylene, p-phenylene, m-phenylene, o-phenylene, or —CH=CH—Ph—CH=CH—.

* * * * *